(12) United States Patent
Senninger et al.

(10) Patent No.: US 9,359,224 B2
(45) Date of Patent: Jun. 7, 2016

(54) FILTER UNIT WITH FLOW REGULATOR

(71) Applicant: Whirlpool Corporation, Benton Harbor, MI (US)

(72) Inventors: Mark M Senninger, Saint Joseph, MI (US); Gregory G Hortin, Henderson, KY (US); Verne H Myers, Benton Harbor, MI (US); Joseph R Peters, Saint Joseph, MI (US); Nihat Cur, Saint Joseph, MI (US)

(73) Assignee: Whirlpool Corporation, Benton Habor, MI (US)

( * ) Notice: Subject to any disclaimer, the term of this patent is extended or adjusted under 35 U.S.C. 154(b) by 552 days.

(21) Appl. No.: 13/842,364

(22) Filed: Mar. 15, 2013

(65) Prior Publication Data

US 2014/0144822 A1    May 29, 2014

Related U.S. Application Data

(60) Provisional application No. 61/729,878, filed on Nov. 26, 2012.

(51) Int. Cl.
*B01D 35/00* (2006.01)
*B01D 21/24* (2006.01)
(Continued)

(52) U.S. Cl.
CPC ............... *C02F 1/003* (2013.01); *B01D 27/08* (2013.01); *B01D 35/147* (2013.01); *B01D 35/153* (2013.01); *B01D 2201/302* (2013.01); *B01D 2201/303* (2013.01); *C02F 1/28* (2013.01); *C02F 1/42* (2013.01); *C02F 2201/004* (2013.01); *C02F 2201/006* (2013.01); *C02F 2301/043* (2013.01); *C02F 2307/12* (2013.01); *F25D 23/126* (2013.01); *F25D 2323/121* (2013.01)

(58) Field of Classification Search
None
See application file for complete search history.

(56) References Cited

U.S. PATENT DOCUMENTS

| 4,681,677 | A | 7/1987 | Kuh et al. |
| 4,698,164 | A | 10/1987 | Ellis |

(Continued)

FOREIGN PATENT DOCUMENTS

| CN | 1143332 A | 2/1997 |
| KR | 100843152 | 7/2008 |

(Continued)

OTHER PUBLICATIONS

PCT Application No. PCT/US2013068970, filed Nov. 7, 2013, Applicant: Whirlpool, Search Report and Witten Opinion of the International Searching Authority, mail date: Apr. 3, 2014 re: same.

*Primary Examiner* — Nam Nguyen
*Assistant Examiner* — Richard Gurtowski

(57) ABSTRACT

A filtration system for an appliance includes a water source coupled with the appliance to provide an intake water flow. A filter unit is coupled with water source to receive the intake water flow and dispense a filtered water flow. An isolation valve is coupled between the water source and the filter unit and movable between a first position and a second position. A distribution valve is coupled with an ice maker and a water dispenser of the appliance. The distribution valve receives the filtered water flow when the isolation valve is in the first position, and the distribution valve receives the intake water flow via a bypass line when the isolation valve is in the second position. The isolation valve is configured to move to the second position upon expiration of the service life of the filter unit.

19 Claims, 18 Drawing Sheets

(51) Int. Cl.
*A01G 25/16* (2006.01)
*C02F 1/00* (2006.01)
*B01D 35/147* (2006.01)
*B01D 35/153* (2006.01)
*B01D 27/08* (2006.01)
*C02F 1/28* (2006.01)
*C02F 1/42* (2006.01)
*F25D 23/12* (2006.01)

(56) References Cited

U.S. PATENT DOCUMENTS

| | | |
|---|---|---|
| 5,527,451 A | 6/1996 | Hembree et al. |
| 5,622,618 A | 4/1997 | Brane et al. |
| 5,813,245 A | 9/1998 | Coates et al. |
| 5,907,958 A | 6/1999 | Coates et al. |
| 5,928,504 A | 7/1999 | Hembre et al. |
| 5,997,734 A | 12/1999 | Koski et al. |
| 6,003,734 A * | 12/1999 | Oh .............. 222/146.6 |
| 6,303,023 B1 | 10/2001 | Gebhard et al. |
| 6,491,811 B2 | 12/2002 | Conrad et al. |
| 6,659,050 B1 * | 12/2003 | Creech et al. .............. 123/41.08 |
| 7,252,757 B2 | 8/2007 | Warren et al. |
| 2003/0067378 A1 | 4/2003 | Baarman |
| 2006/0027510 A1 | 2/2006 | Rassinger |
| 2006/0118476 A1 * | 6/2006 | Weindorf et al. ............. 210/234 |
| 2012/0000858 A1 | 1/2012 | Butler et al. |
| 2012/0031821 A1 | 2/2012 | Swain |

FOREIGN PATENT DOCUMENTS

| | | |
|---|---|---|
| RU | 02080152 C1 | 5/1997 |
| RU | 0002430768 C1 | 10/2011 |

* cited by examiner

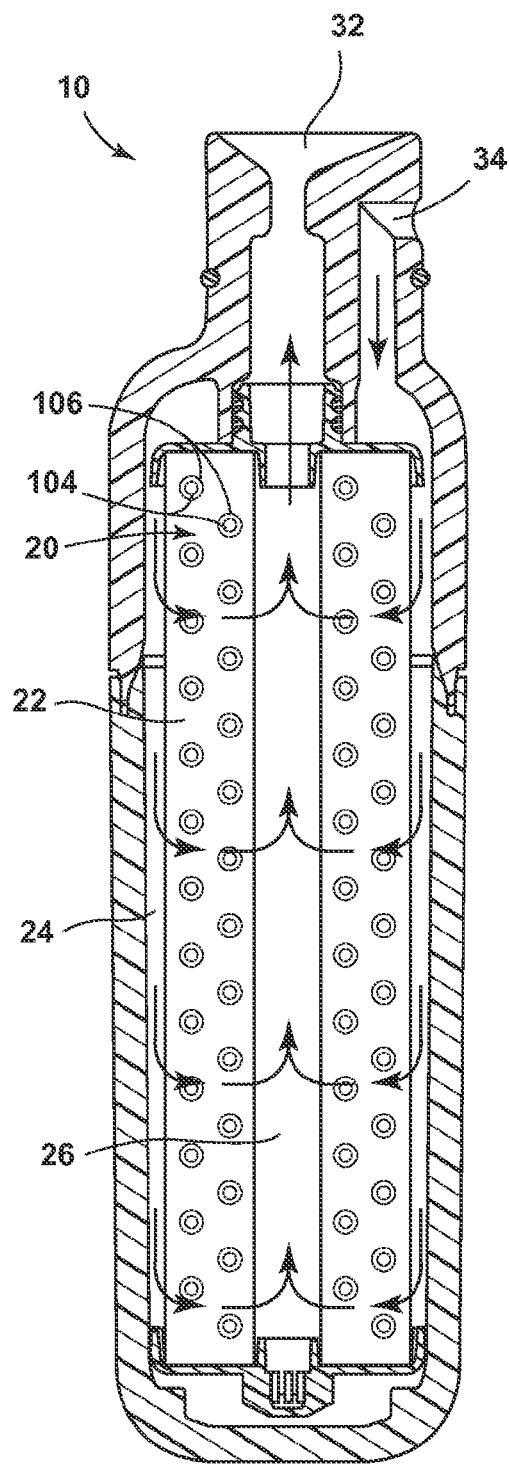
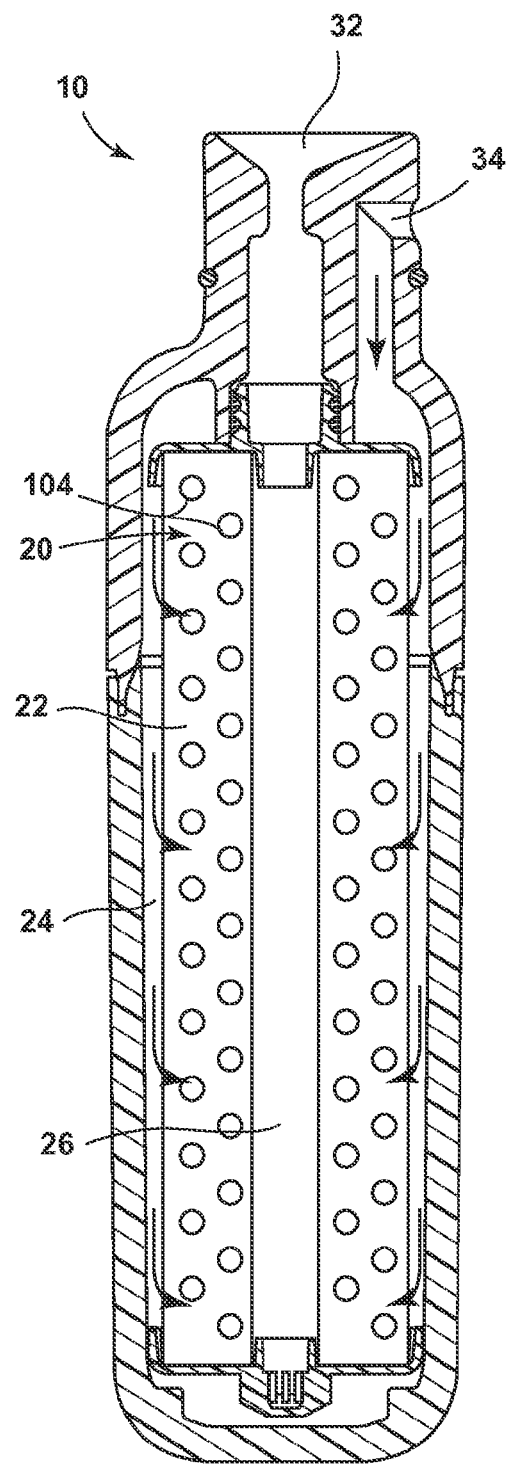
FIG. 9  FIG. 10

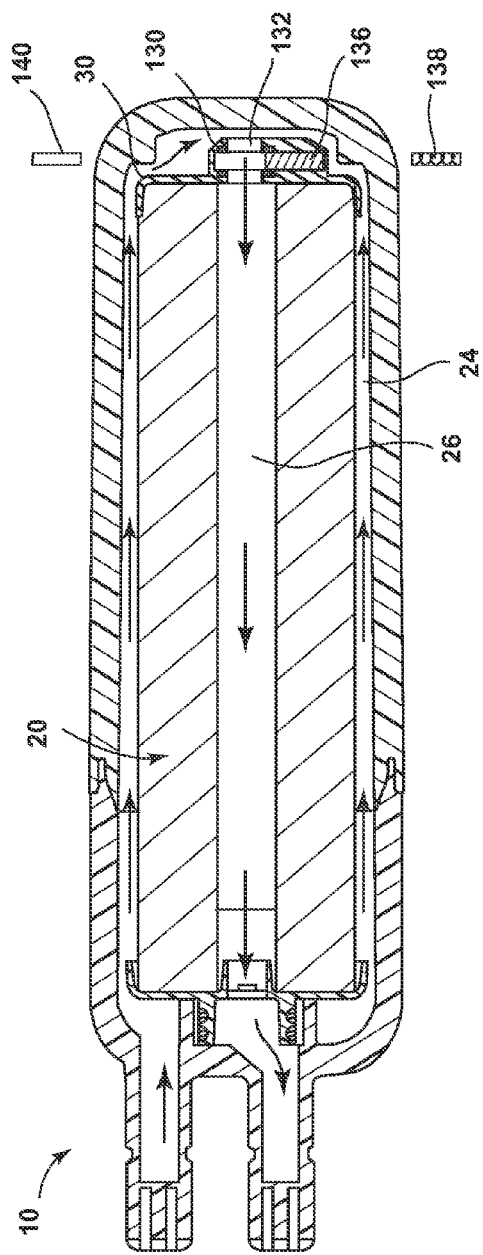
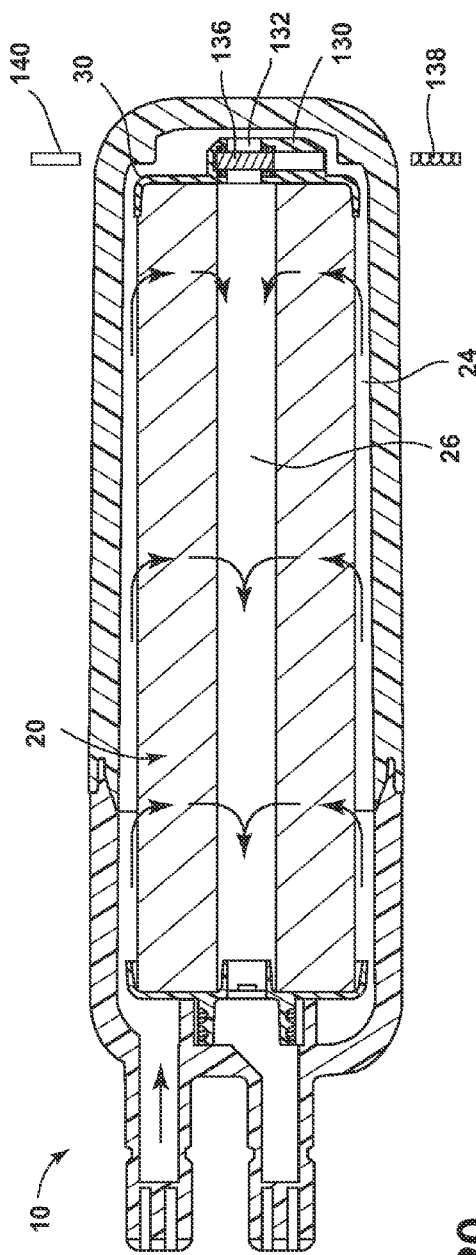
FIG. 19
FIG. 20

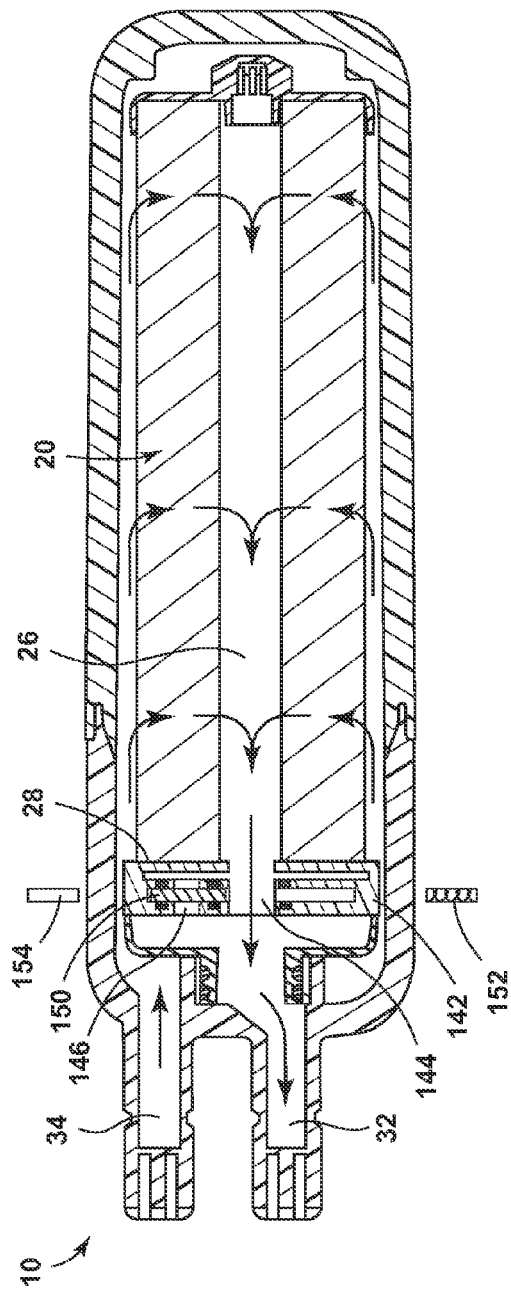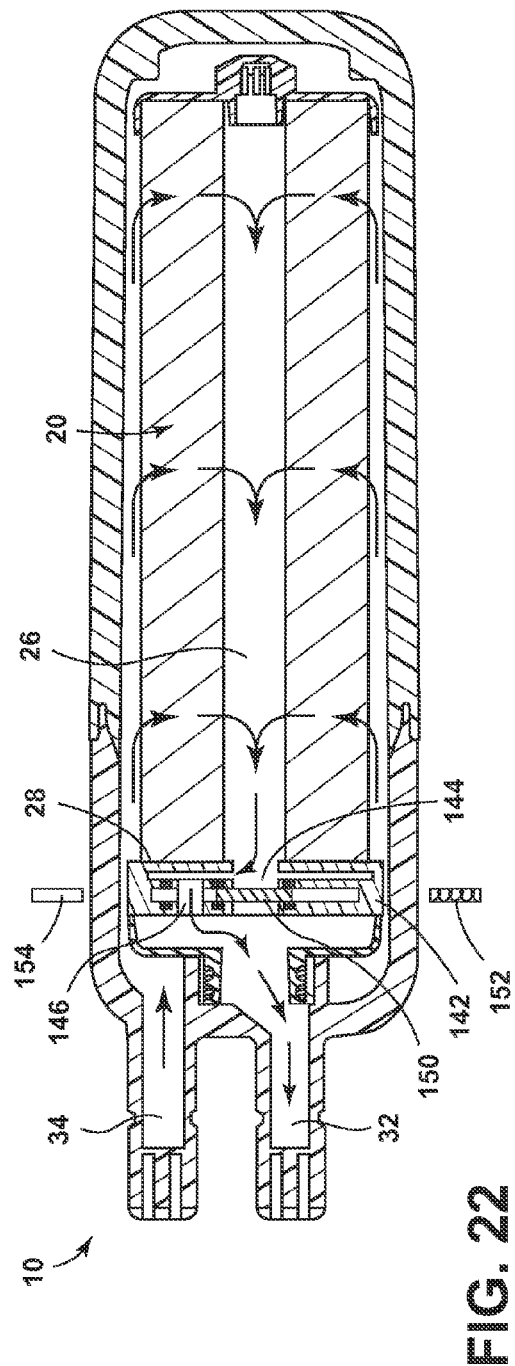
FIG. 21
FIG. 22

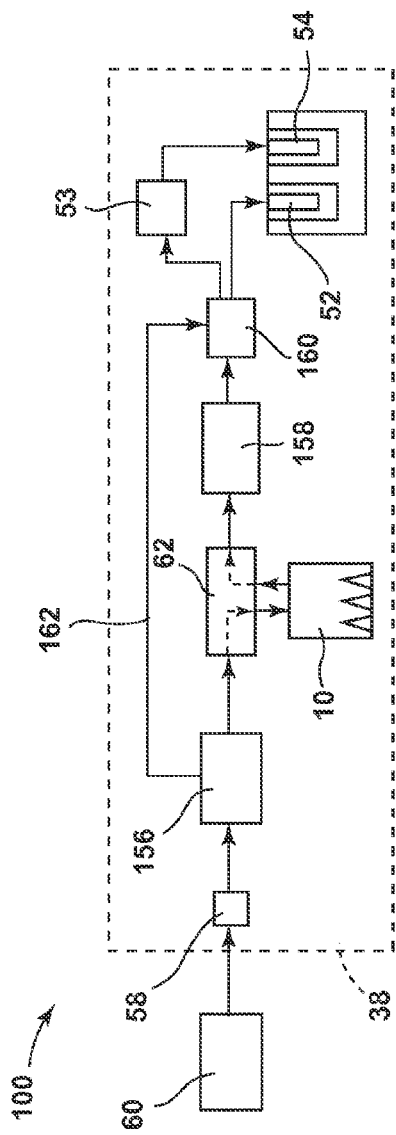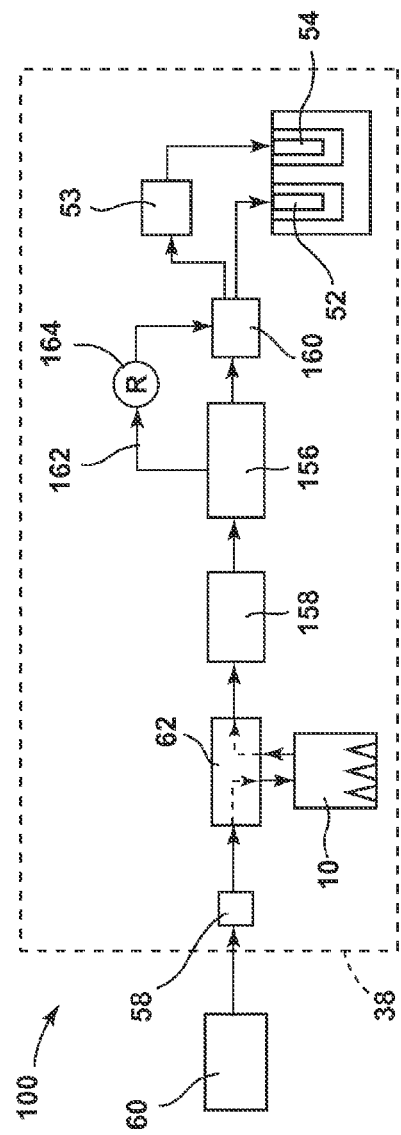

US 9,359,224 B2

FILTER UNIT WITH FLOW REGULATOR

CROSS REFERENCE TO RELATED APPLICATION

The present application claims the benefit under 35 USC §119(e) of provisional application Ser. No. 61/729,878, filed Nov. 26, 2012, entitled FILTRATION SYSTEM WITH FLOW REGULATION COMPONENTS, the entire contents of which are incorporated herein by reference.

FIELD OF THE INVENTION

The present invention generally relates to a filtration system, and more specifically, to a filtration system that includes one or more components configured to reduce, stop, or otherwise alter liquid flow to indicate expiration of a filter unit of the filtration system.

BACKGROUND OF THE INVENTION

Household appliances, such as refrigerators, commonly include a water dispenser and/or an ice maker. The ice maker and water dispenser are typically connected to an external source of water, whereby water flows through a water circulation system in the appliance to the ice maker and/or the dispenser. Such appliances may include a water filter to purify the water supplied to the water dispenser and/or ice maker. Water filters should be replaced after the service life of the filter has expired.

SUMMARY OF THE INVENTION

According to one aspect of the present invention, a filter unit for an appliance, includes a body portion having an exterior surface and an hollow interior volume. A filter media portion is disposed entirely within the interior volume and has a service life. An inlet aperture is disposed on the exterior surface and extends into the interior volume. The inlet aperture fluidly couples with a first side of the filter media portion to deliver a flow of unfiltered water. An outlet aperture is disposed on the exterior surface and extends into the interior volume. The outlet aperture fluidly couples a second side of the filter media portion to dispense a flow of filtered water. A flow regulator disposed within the body portion is configured to reduce the flow of filtered water from dispensing from the outlet aperture upon elapsing the service life.

According to another aspect of the present invention, a filter unit includes a body portion having an exterior surface and an hollow interior volume. A filter media portion is disposed entirely within the interior volume and has a service life. An inlet aperture is disposed on the exterior surface and extends into the interior volume. The inlet aperture fluidly couples with a first side of the filter media portion to deliver a flow of unfiltered water. An outlet aperture is disposed on the exterior surface and extends into the interior volume. The outlet aperture fluidly couples a second side of the filter media portion to dispense a flow of filtered water. A flow regulator is disposed within the interior volume and has a large port, a small port, and a plate slidable between blocking the small port and blocking the large port. The flow regulator is configured to move the plate to block the large port upon elapsing the service life for reduce the flow of filtered water from dispensing from the outlet aperture.

According to yet another aspect of the present invention, a filter unit includes a cylindrical body portion having a proximal end, a distal end, an interior volume there between, and a central axis extending centrally through the longitudinal extent of the interior volume. A filter media portion is disposed within the interior volume. The filter media portion has a permeable media wall spaced away from the body portion to define an exterior passage and surrounding the central axis to define an interior passage. An inlet aperture is disposed on the proximal end and extends into the interior volume. The inlet aperture fluidly couples with the exterior passage to deliver unfiltered water to the permeable media wall. An outlet aperture is disposed on the proximal end and extends into the interior volume. The outlet aperture fluidly couples with the interior passage to dispense filtered water from the permeable media wall. A flow regulator is disposed in fluid connection between the interior passage and the outlet aperture and has a large port, a small port, and a magnetic plate slidable between a first position and a second position. The magnetic plate in the first position substantially prevents filtered water flow from traversing through the small port. The magnetic plate in second position substantially prevents filtered water flow from traversing through the large port. The magnetic plate moves to the second position upon elapsing a service life of the filter media portion.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 9 is a side cross-sectional view of an additional embodiment of a water filter, illustrating impregnated pores;

FIG. 10 is a side cross-sectional view of the additional embodiment of a water filter of FIG. 9, illustrating the impregnated pores expanded;

FIG. 19 is a side cross-sectional view of an additional embodiment of a water filter, illustrating a magnet at a distal end of the water filter in an open position;

FIG. 20 is a side cross-sectional view of the additional embodiment of a water filter of FIG. 19, illustrating the magnet at the distal end in a closed position;

FIG. 21 is a side cross-sectional view of an additional embodiment of a water filter, illustrating a magnet at a proximal end of the water filter in an first position;

FIG. 22 is a side cross-sectional view of the additional embodiment of a water filter of FIG. 21, illustrating the magnet in a second position;

FIG. 23 is a schematic diagram of one embodiment of a water circuit of the filtration system; and FIG. 24 is a schematic diagram of an additional embodiment of a water circuit of the filtration system.

DETAILED DESCRIPTION

Figure 1:
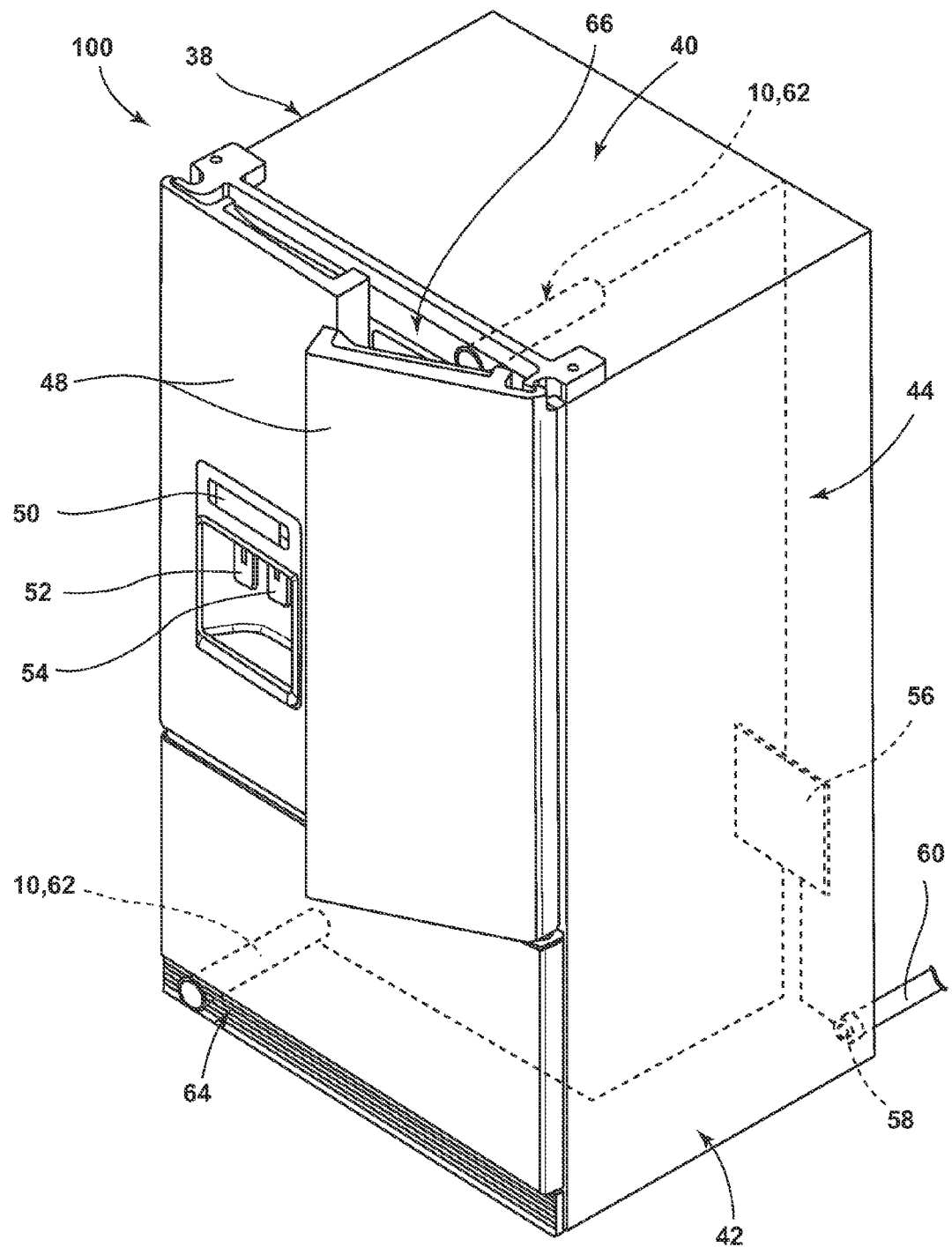
FIG. 1 is a top perspective view of one embodiment of an appliance having a filtration system of the present invention.

For purposes of description herein, the terms "upper," "lower," "right," "left," "rear," "front," "vertical," "horizontal," and derivates thereof shall relate to the customizable multi-stage fluid treatment assembly as oriented in FIG. 1. However, it is to be understood that the customizable multi-stage fluid treatment assembly may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-24, a filtration system is generally identified with reference numeral 100. The filtration system 100 includes a filter unit 10 that has a cylindrical body portion 12 with a proximal end 14, a distal end 16, and an interior volume 18 there between. A central axis of the body portion 12 extends centrally through the longitudinal extent of the interior volume 18. A filter media portion 20 is disposed within the interior volume 18. The filter media portion 20 has a permeable media wall 22 that is spaced away from the body portion 12 to define an exterior passage 24 and the permeable media wall 22 surrounds the central axis to define an interior passage 26. A first end cap 28 is coupled between the filter media portion 20 and the proximate end 14 of the body portion 12. A second end cap 30 is coupled with the filter media portion 20 proximate the distal end 16 of the body portion 12. An outlet aperture 32 is disposed on the proximal end 14 of the body portion 12 and extends into the interior volume 18. The interior passage 26 extends through the first end cap 28 and couples with the outlet aperture 32 to dispense filtered water. An inlet aperture 34 is disposed on the proximal end 14 and extends into the interior volume 18. The exterior passage 24 couples with the inlet aperture 34 and extends to the permeable media wall 22 to deliver the unfiltered water. The first and second end caps 28, 30 prevent unfiltered water from passing from the exterior passage 24 to the interior passage 26 without passing through the filter media portion 20. A flow regulator 36 is configured to reduce or stop the filtered water from dispensing from the outlet aperture 32 upon elapsing a service life of the filter media portion 20.

With reference to FIG. 1, a refrigerator appliance 38 according to one aspect of the present disclosure includes an insulated cabinet 40 forming an interior freezer compartment 42 and an interior refrigerator compartment 44 cooled with at least one refrigeration circuit. As shown, the freezer compartment 42 is arranged below and separate from the refrigerator compartment 44 and is enclosed with a slidable drawer that has an insulated door 46. It is conceivable that the freezer compartment 42 may be alternatively arranged relative to the refrigerator compartment 44 and may include hingable doors or an alternative enclosure. The refrigerator compartment 44 is enclosed with two hingable doors 48, in a French-style door arrangement. The left refrigerator door 48 includes an interactive display 50, a water dispenser 52, and an ice dispenser 54 that receives ice from an ice maker within the appliance 38. The right refrigerator door 48 is in an open position defined by the door 48 pivoted away from a side wall of the insulated cabinet 40 to expose the refrigerator compartment 44. The refrigerator compartment 44 may also conceivably include an alternative enclosure and an alternative location and configuration relative to the freezer compartment 42. It is also conceivable that the refrigerator appliance 38 may alternatively be an appliance with only a refrigerator compartment, an appliance with only a freezer compartment, an appliance without an ice dispenser or water dispenser, an appliance with only an ice maker, and other conceivable appliances as one in the art would generally understand.

As also illustrated in FIG. 1, the filter unit 10 is operably connected to the appliance 38 to receive water from a water distribution system 56 of the appliance 38, as described in more detail below. As shown, the water distribution system 56 of the appliance 38 includes a connector 58 on a rear surface of the insulated cabinet 40 that couples with an external water source 60 to supply an unfiltered water flow to the filter unit 10. The water source 60 may also conceivably include a re-fillable water basin located within or adjacent to the appliance. The filter unit 10 generally engages the appliance 38 via a filter head assembly 62 in either a lower grille area 64 below the freezer compartment 42 or an upper panel area 66 above the refrigerator compartment 44. However, it is conceivable that the filter unit 10 may engage the appliance 38 at an alternative location. Further, the filter unit 10 may also be used in other applications, including other appliances that store, use, or dispense, ice, water, or other liquid to be filtered and/or treated. In addition, the filter unit 10 may be used with a household faucet, typically by engagement at or proximate the faucet outlet, or other domestic water source.

Figure 2:
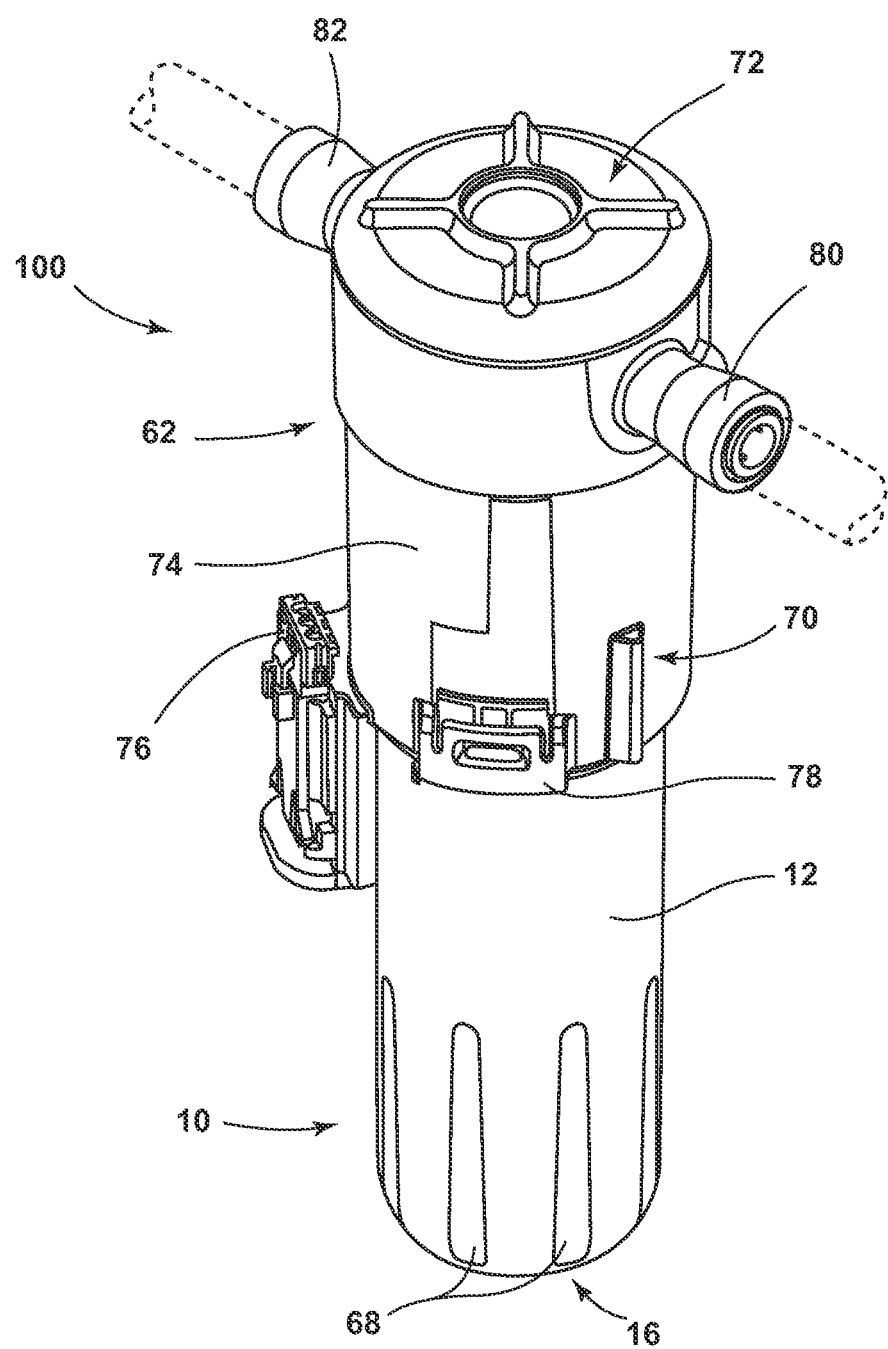
FIG. 2 is a top perspective view of a water filter engaged with a filter head assembly.
Figure 3:
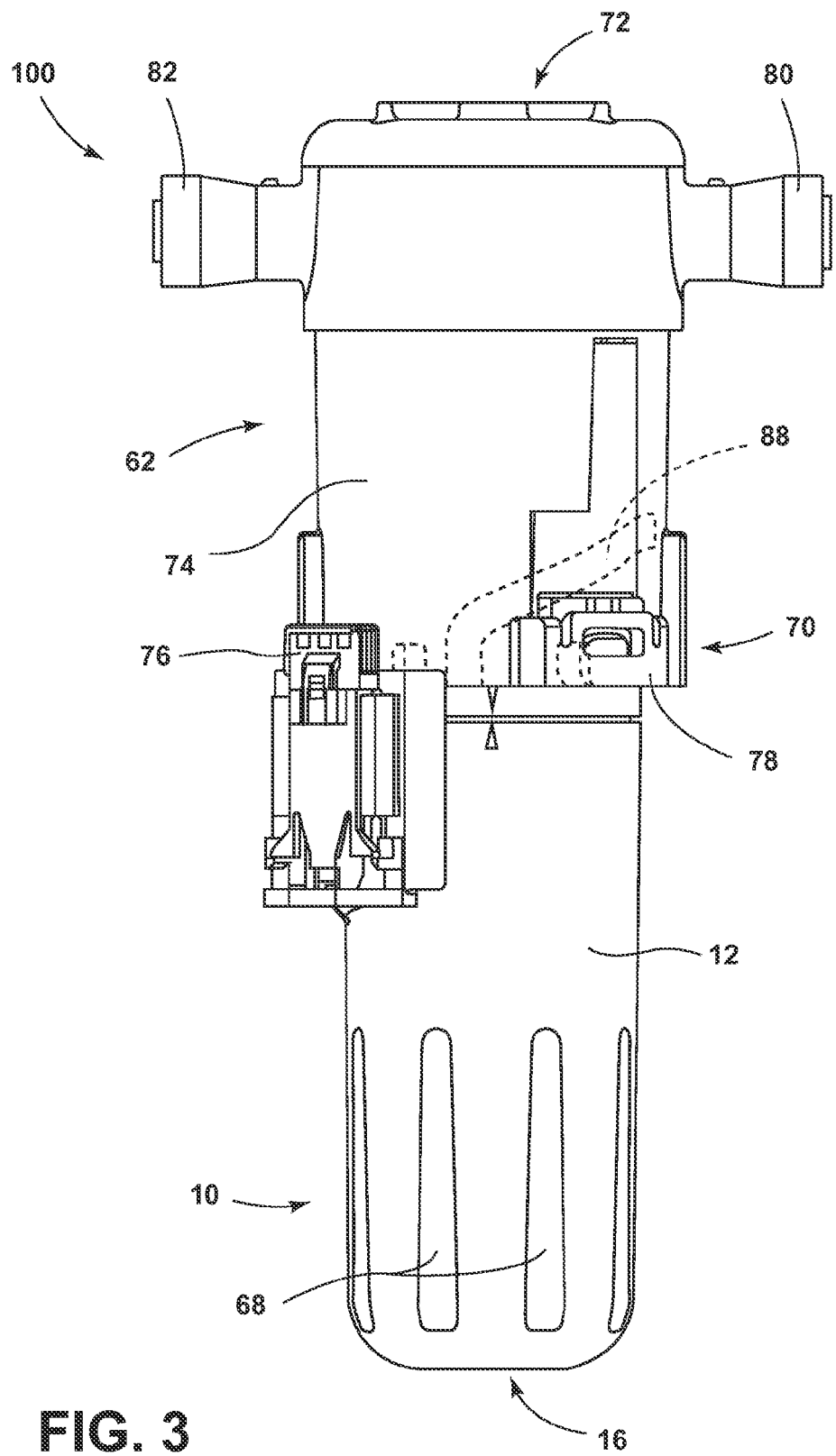
FIG. 3 is a side elevational view of the water filter engaged with the filter head assembly of FIG. 2.

As shown in FIGS. 2-3, the filter unit 10 is engaged with the filter head assembly 62. The body portion 12 of the filter unit 10 includes a cylindrical shape with a diameter that is easily graspable by the hand of a user. A multitude of grasping cutouts 68 are disposed on the body portion 12 proximate the distal end 16 to provide a gripping surface for a user to engage and disengage the filter unit 10 from the filter head assembly 62, as engagement of the filter unit 10 typically includes rotational and longitudinal movement of the filter unit 10 relative to the filter head assembly 62. The filter head assembly 62 includes a filter receiving end 70 and a water receiving end 72. The filter receiving end 64 has a cylindrical receiver 74 adapted to receive all or at least a portion of the proximal end 14 of the filter unit 10. The cylindrical receiver 74 includes an electrical connector 76 that is adapted for engagement with and to provide electricity and data communication with at least one electronic device that communicates with the filter unit 10, as described in more detail below. The cylindrical receiver 74 also includes a securing clip 78 that couples with the exterior surface of the body portion 12.

Figure 4:
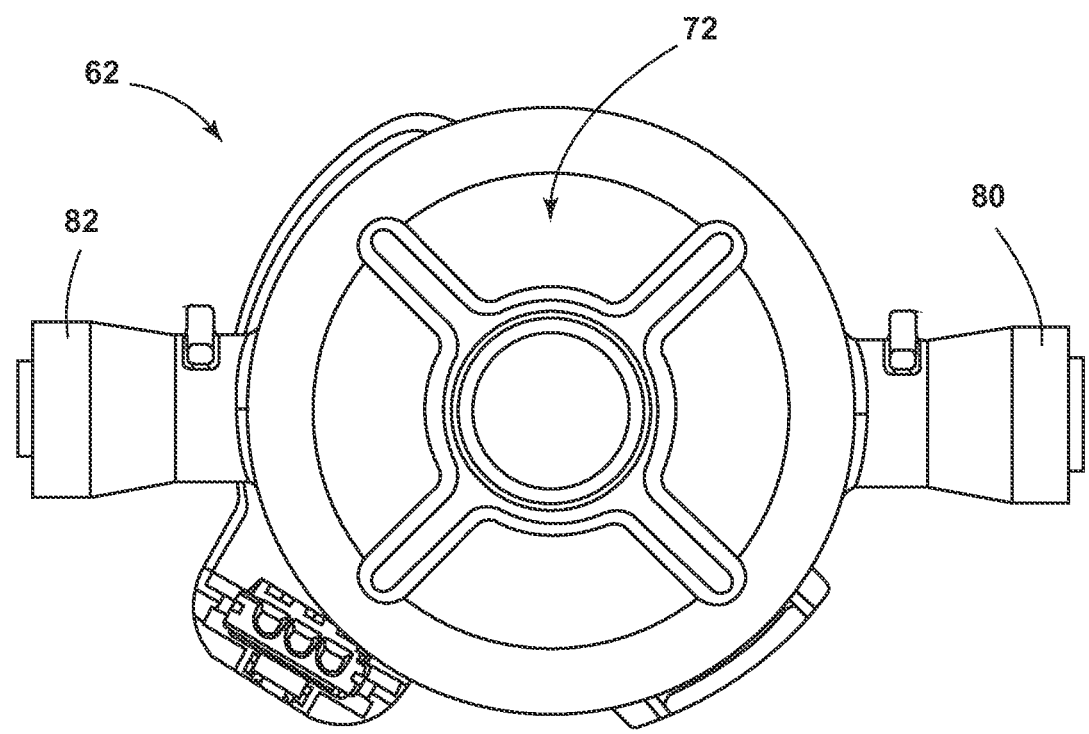
FIG. 4 is a top plan view of the water filter engaged with the filter head assembly of FIG. 2.

The water end 72 of the filter head assembly 62, as illustrated in FIGS. 2-4, includes an inlet member 80 and an outlet member 82 laterally extending on opposite sides of the filter head assembly 62. The inlet member 80 generally couples with the water source 60 via at least one water line to receive the unfiltered water flow. In addition, the outlet member 82 generally couples with the water dispenser 52 (FIG. 1) and the ice maker within the appliance 38 via at least one water line to dispense the filtered water flow. It is contemplated that the inlet and outlet members could be at any angle relative to one another and disposed at any location on the filter head assembly 62 to connect with the inlet aperture 34 and outlet aperture 32 of the filter unit 10 (FIG. 5).

Figure 5:
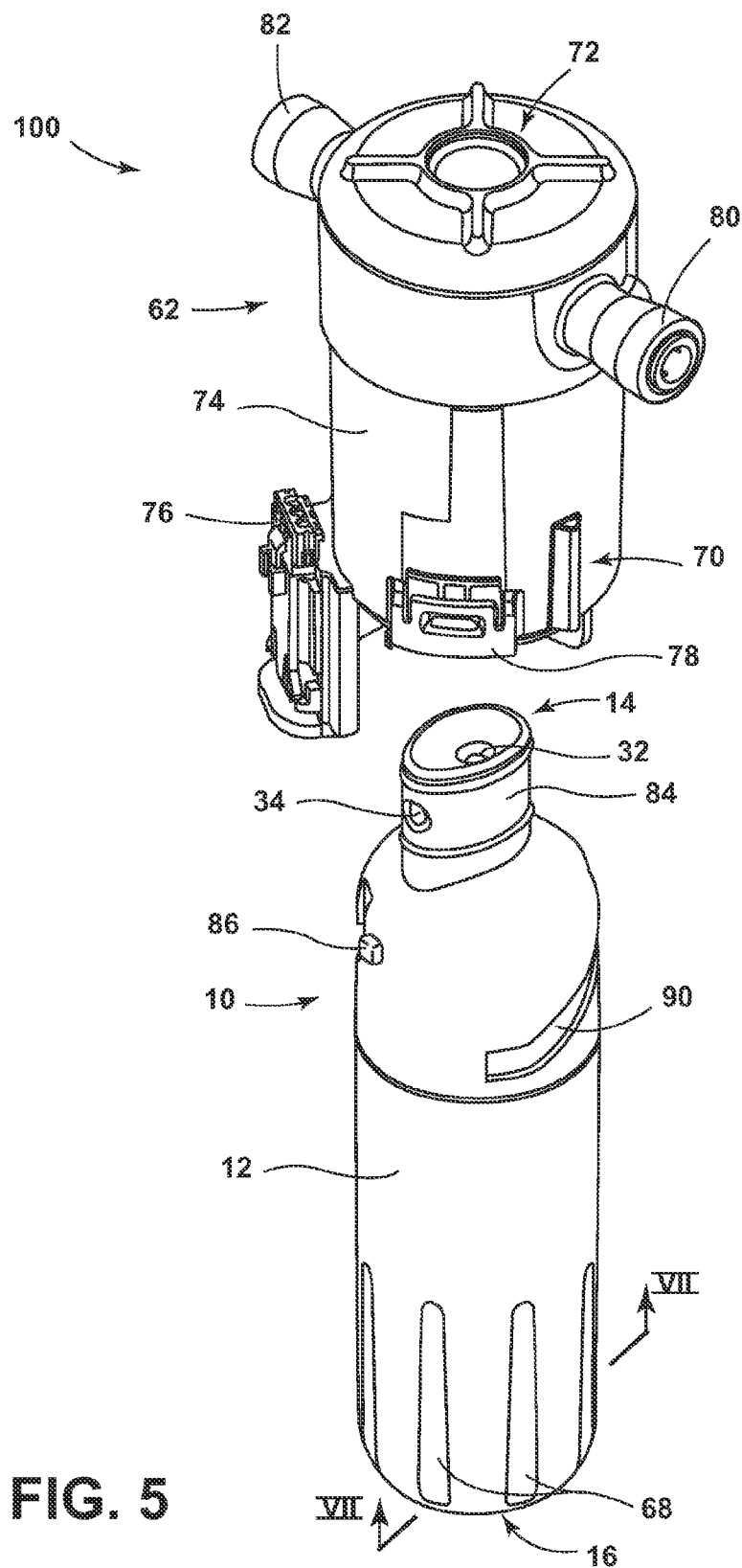
FIG. 5 is a top perspective view of the water filter withdrawn from the filter head assembly of FIG. 2.
Figure 5A:
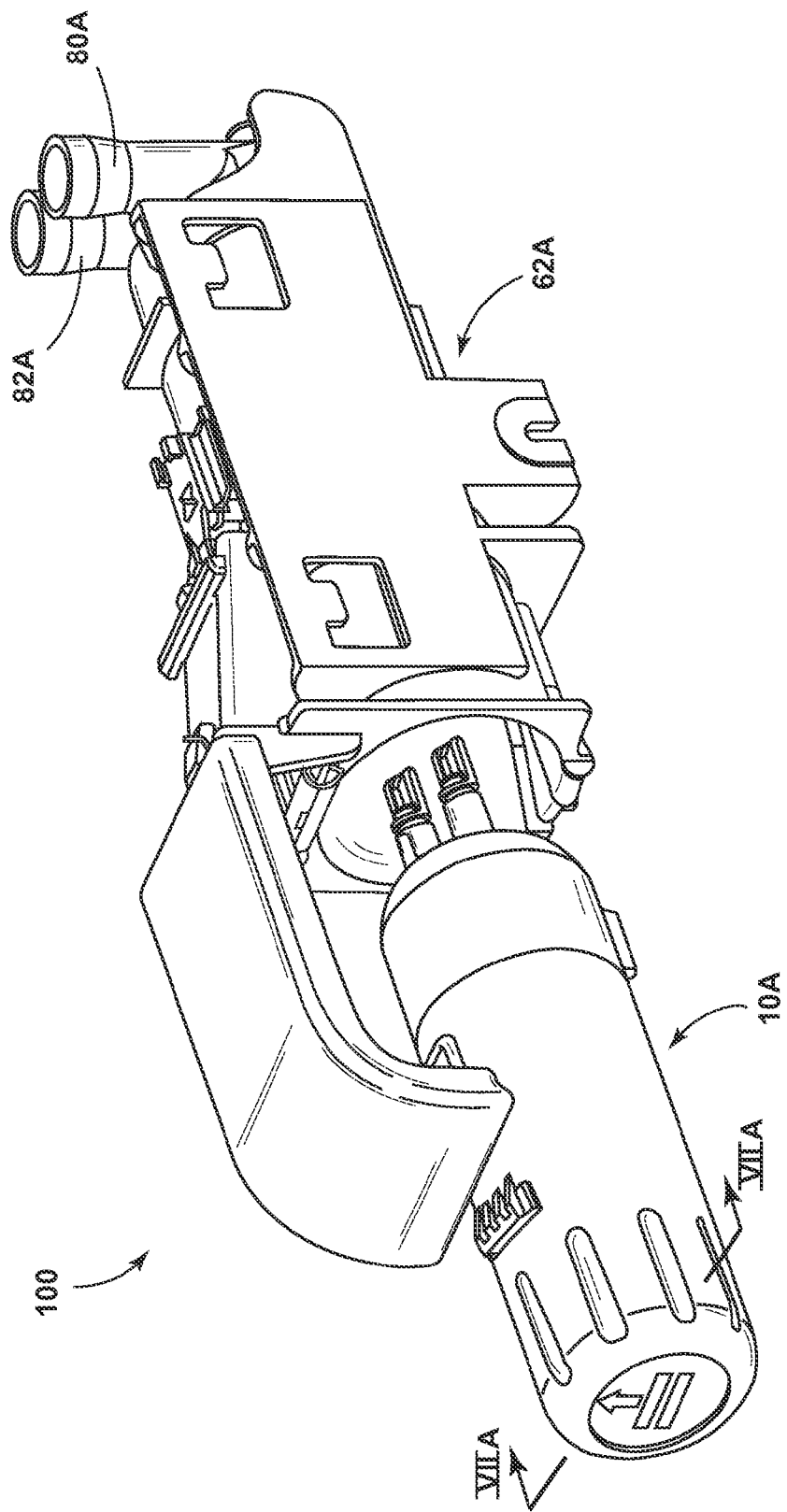
FIG. 5A is a top perspective view of an additional embodiment a water filter withdrawn from a filter head assembly.
Figure 6A:
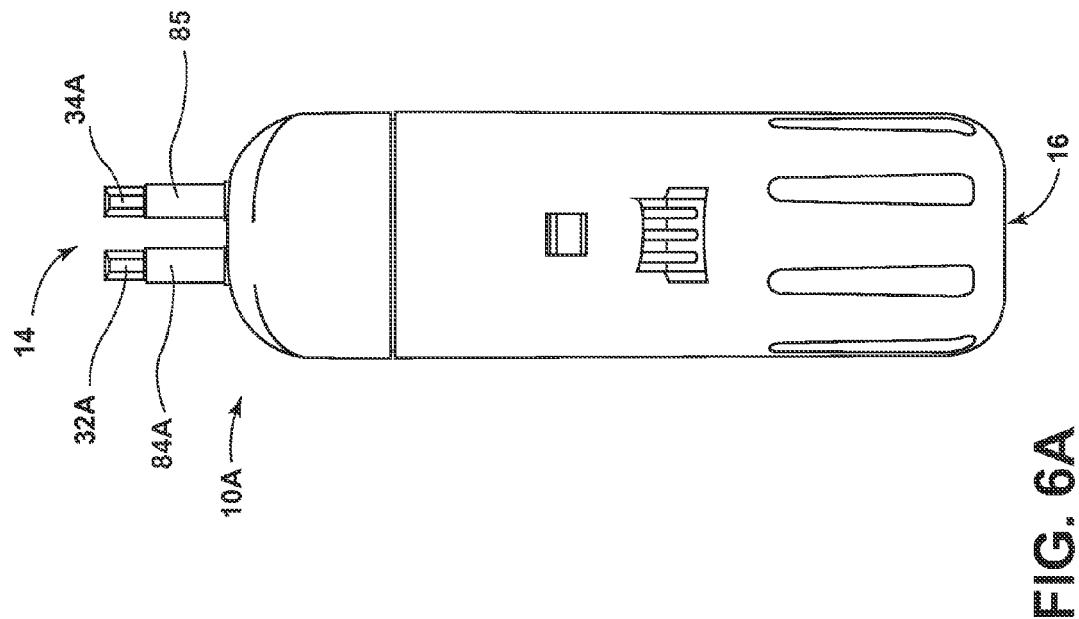
FIG. 6A is a side elevational view of the additional embodiment of the water filter of FIG. 5A.
Figure 6:
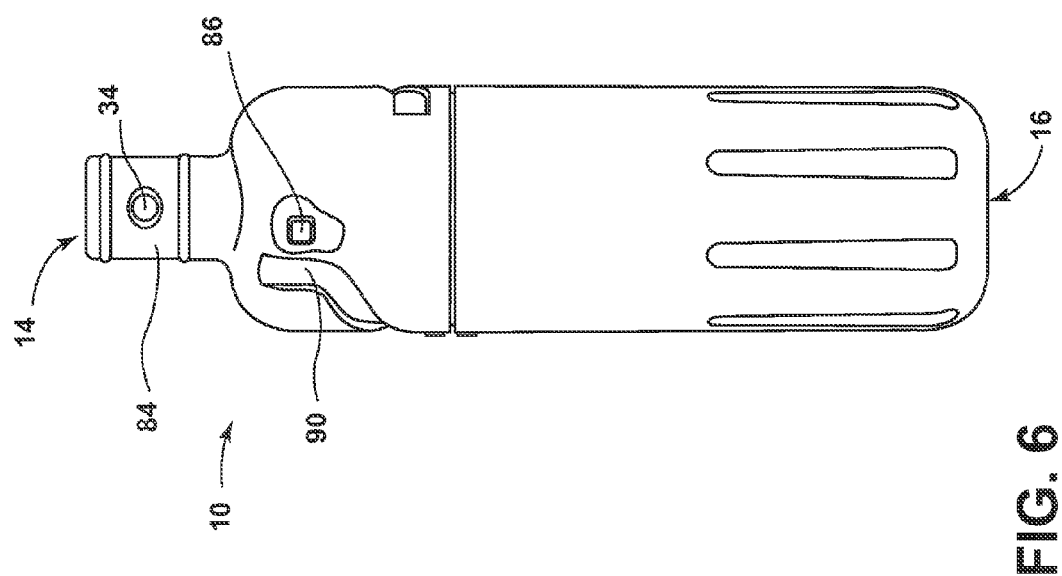
FIG. 6 is a side elevational view of the water filter of FIG. 5.

Referring now to FIGS. 5-6, the proximal end 14 of the body portion 12 includes an engagement protrusion 84 that has a generally oval cross-sectional shape. The engagement protrusion 84 extends longitudinally from the proximal end 12 in general alignment with the longitudinal extent of the body portion 12. As shown in FIG. 5, the engagement protrusion 84 is generally disposed at an offset location on the proximal end 12, substantially aligning the outlet aperture 32 with the central axis of the body portion 12. The body portion 12 also includes a laterally extending key member 86 that is configured to slidably engage a helical shaped key slot 88 (FIG. 3) on the interior surface of the cylindrical receiver 74 of the filter head assembly 62 to engage the filter unit 10 therewith. Similarly, the body portion 12 includes a helical shaped retention slot 90 to slidably engage a retention member on the filter head assembly 62.

As illustrated in FIGS. 5A-6A, an additional embodiment of the filter unit 10A and the filter head assembly 62A are shown. The filter unit 10A includes an outlet engagement protrusion 84A longitudinally extending from the proximal end 14 that has the outlet aperture 32A therein. The proximal end 14 also includes an inlet engagement protrusion 85 longitudinally extending from the proximal end 14 at an offset location from the outlet engagement protrusion 84A. The inlet engagement protrusion 85 similarly includes the inlet aperture 34A therein. The inlet and outlet engagement protrusions 84A, 85 are configured to engage the inlet and outlet members 80A, 82A, respectively, upon longitudinal insertion of the filter unit 10A into the filter head assembly 62A. As such, it is conceivable that yet additional embodiments may include alternative arrangements of the filter unit that are configured to engage alternative filter head assemblies.

Figure 7:
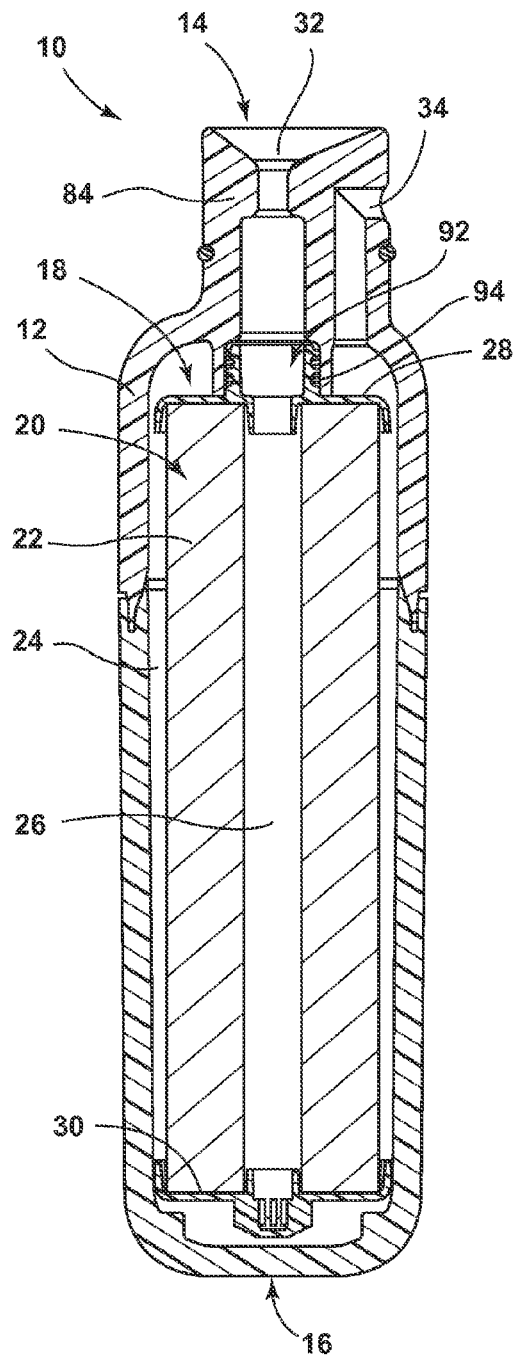
FIG. 7 is a cross-sectional view of the water filter of FIG. 5 taken at line VII-VII.
Figure 7A:
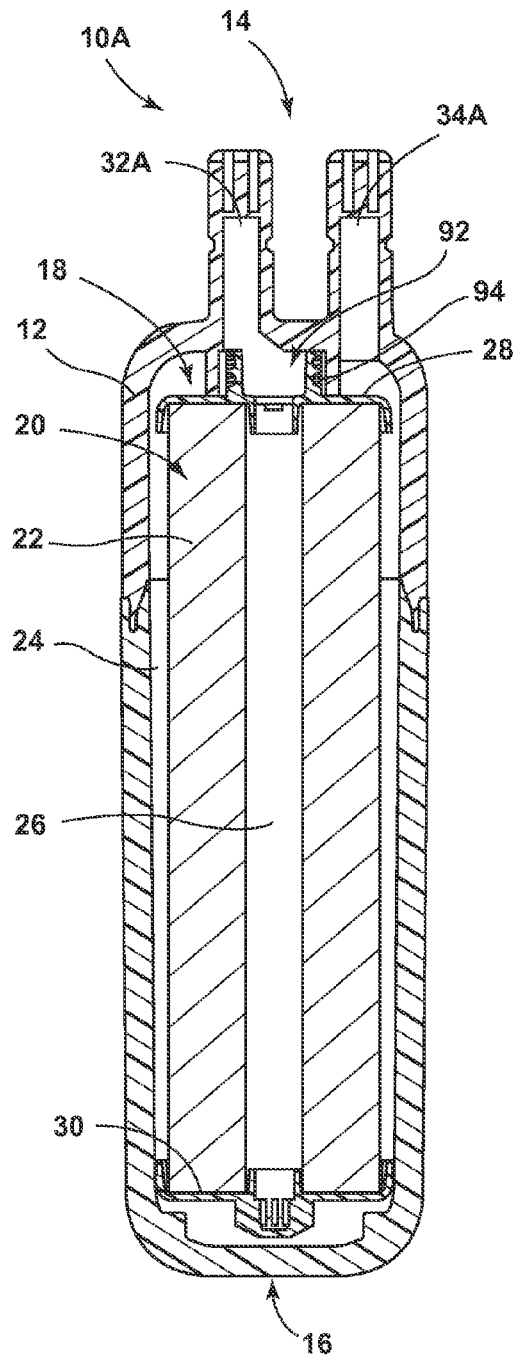
FIG. 7A is a cross-sectional view of the additional embodiment of the water filter of FIG. 5A taken at line VIIA-VIIA.

As shown in FIGS. 7-7A, the body portion 12 of the filter unit 10 includes an interior volume 18 between the proximal end 14 and the distal end 16. The central axis of the body portion 12 extends centrally through the longitudinal extent of the interior volume 18. The interior volume 18 includes a filter media portion 20 that has a permeable media wall 22 that is spaced away from the interior surface of the body portion 12 to define the exterior passage 24. Further, the permeable media wall 22 surrounds the central axis of the interior volume 18 to define the interior passage 26. The filter media portion 20 is typically configured to filter and purify water that passes through the media wall 22, such that the filter media portion 20 may include filter media material such as: carbon (e.g., activated carbon particles, such as mesoporous activated carbon, carbon powder, particles sintered with a plastic binder, carbon particles coated with a silver containing material, or a block of porous carbon); ion exchange material (e.g., resin beads, flat filtration membranes, fibrous filtration structures, etc.); zeolite particles or coatings (e.g., silver loaded); polyethylene; charged-modified, melt-blown, or microfiber glass webs; alumina; aluminosilicate material; and diatomaceous earth. The media material may also be impregnated or otherwise disposed on a porous support substrate, such as a fabric material, a paper material, a polymer screen, or other conceivable porous structures that may be contained in the permeable media wall 22 to filter and purify water. It is also conceivable that the filter media portion 20 may be configured to treat water that passes through the media wall 22, whereby the filter media portion may include a treatment media material configured to add a descaling agent to the water, add a vitamin to the water, add a mineral to the water, add a pharmaceutically active agent to the water, and add a color to the water, or mixtures thereof.

The filter media portion 20 is configured to include a service life based upon the types of media material contained therein. The service life may be quantified in the amount of water flow that optimally passes through the filter media portion 20 before the filtration, purification, and/or treatment effects of the media material deteriorate or no longer perform as desired. The service life may also therefore be quantified in the typical amount of time a user takes to flow such an amount of water through the filter media portion 20, based upon usage of the ice dispenser 54, the ice maker, and the water dispenser 52. The service life may also factor in the amount of time the media material may deteriorate after being initially exposed to any water flow. The service life of one embodiment of the filter unit 10 configured to filter and purify water is typically at least 100 to 300 gallons and, more typically 100 to 200 gallons, depending upon the frequency of use and the source water quality. This service life generally equates to approximately 180 days; however, alternative embodiments including a treatment media material have a much shorter service life.

As also illustrated in FIGS. 7-7A, a first end cap 28 is coupled between the filter media portion 20 and the proximal end 14 of the body portion 12. More specifically, the first end cap 28 includes a nozzle portion 92 that extends toward and in alignment with the engagement protrusion 84. The interior passage 26 extends centrally through the nozzle portion 92 of the first end cap 28 and couples with the outlet aperture 32 to dispense filtered water. The nozzle portion 92 has seals 94 to prevent, in conjunction with other portions of the first end cap 28, cross contamination of water flowing through the exterior passage 24 and the interior passage 26. A second end cap 30 is coupled with the filter media portion 20 proximate the distal end 16 of the body portion 12. The second end cap 30, similarly prevent unfiltered water from passing from the exterior passage 24 to the interior passage 26 without passing through the permeable media wall 22. It is contemplated that the first and second end caps 28, 30 may be an integral component with the filter media portion 20 or that the filter media portion 20 may be alternatively configured without end caps to prevent unfiltered water from passing from the exterior passage 24 to the interior passage 26 without passing through the filter media portion 20.

Figure 8:
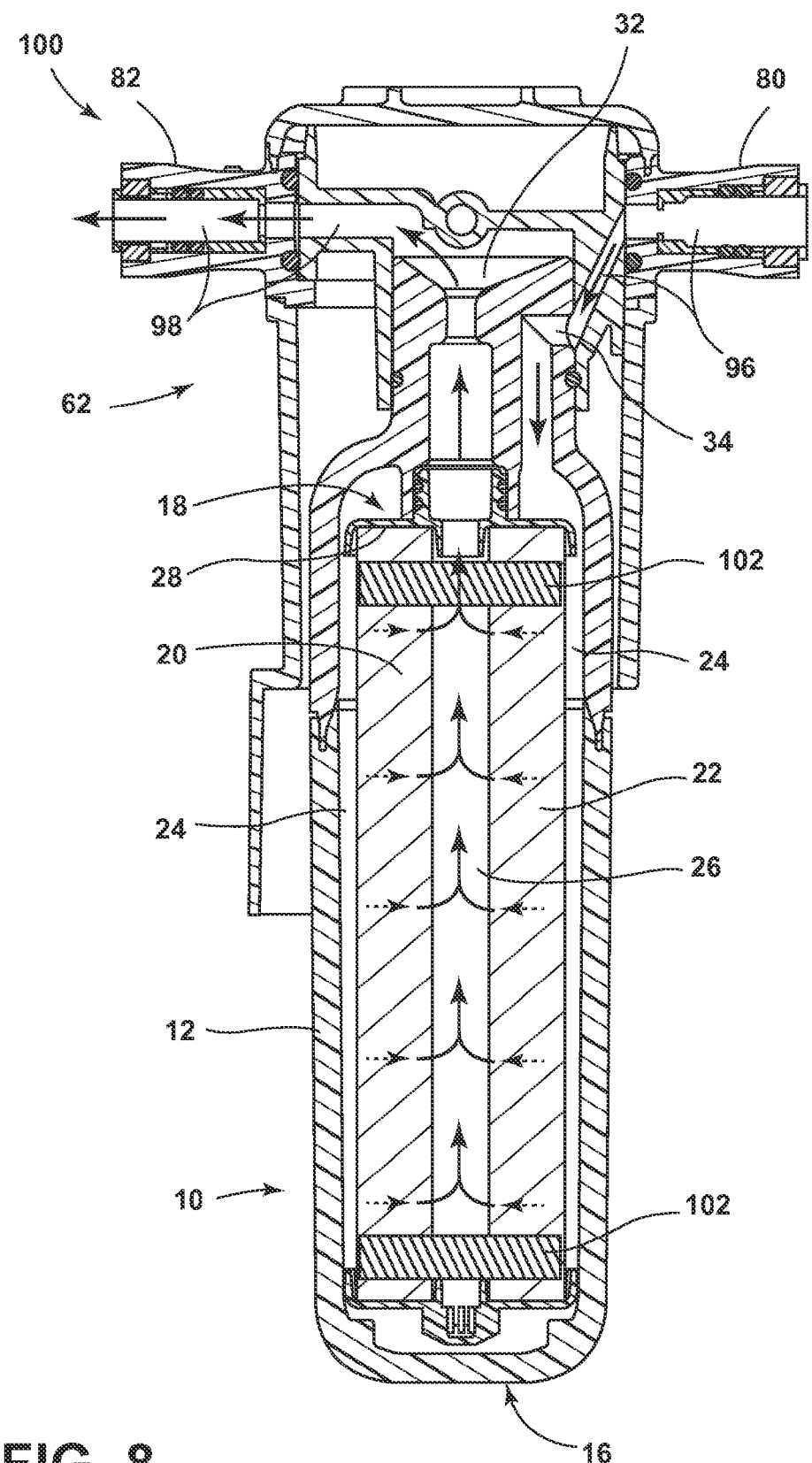
FIG. 8 is a side cross-sectional view of the water filter engaged with the filter head assembly of FIG. 5, illustrating water flow.
Figure 8A:
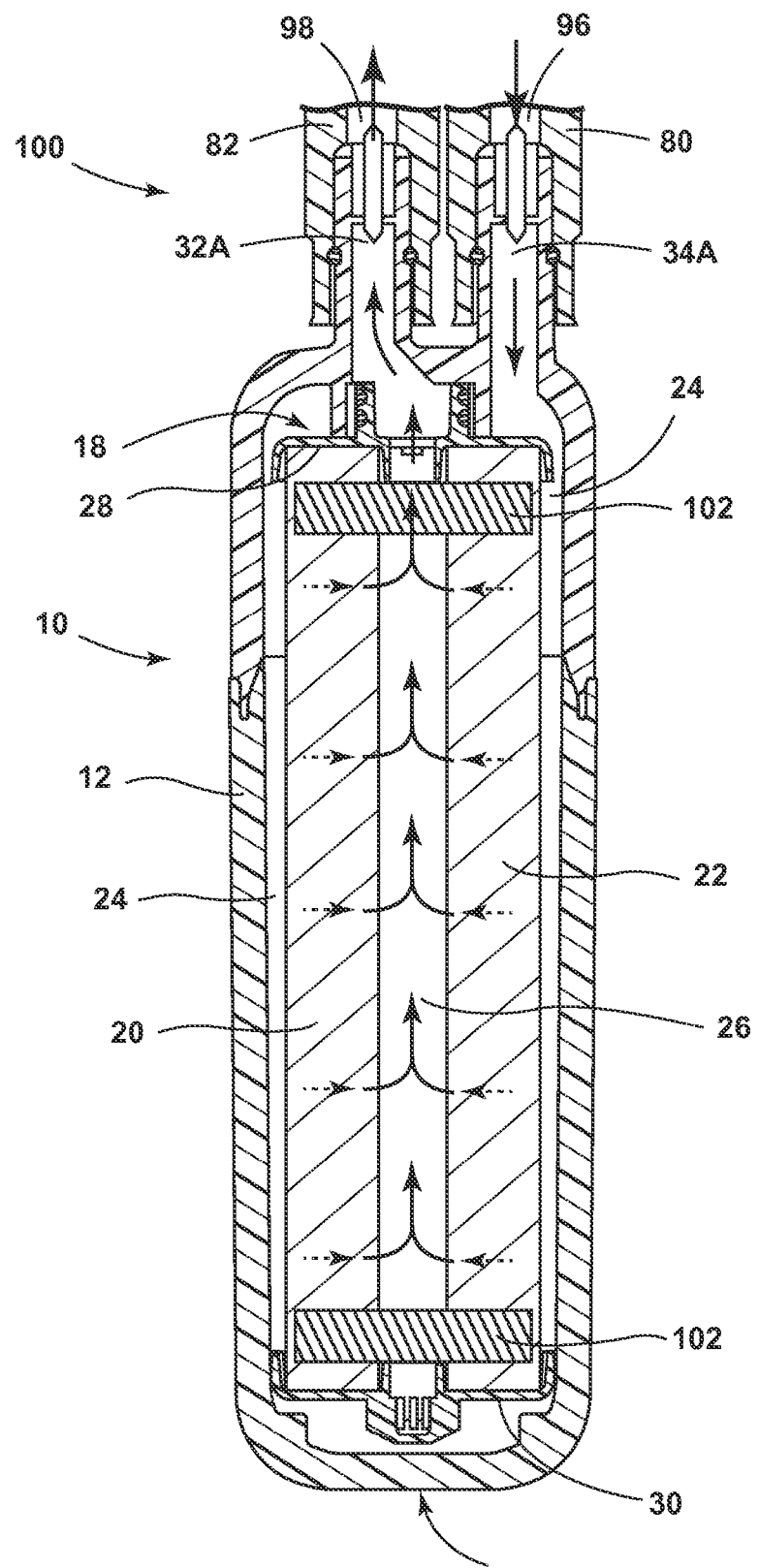
FIG. 8A is a side cross-sectional view of the additional embodiment of the water filter engaged with the filter head assembly of FIG. 5A, illustrating water flow.

The operational water flow of the filter unit 10 in conjunction with the filter head assembly 62 is illustrated in FIGS. 8-8A. As shown, the inlet aperture 34 is disposed on the proximal end of the body portion 12 and extends within the engagement protrusion 84 into the interior volume 18 of the filter unit 10. The inlet member 80 of the filter head assembly 62 includes an inlet passage 96 that couples with the inlet aperture 34 on the filter unit 10 to supply the unfiltered water flow to the filter unit. The inlet aperture 34 fluidly couples with the exterior passage 24, which delivers the unfiltered water flow longitudinally toward the distal end 16 of the filter unit and over the exterior surface of the permeable media wall 22. The unfiltered water flow passes substantially radially inward through the permeable media wall 22 to the interior passage 26, thereby altering the water to a filtered water flow. The filtered water flow travels longitudinally toward the proximal end 14 of the filter unit 10, through the first end cap 28 and out of the filter unit through the outlet aperture 32. The outlet aperture 32 fluidly couples with an outlet passage 98 within the outlet member 82 of the filter head assembly 62.

As generically shown in FIGS. 8-8A, a flow regulator 102 is configured to reduce or stop the filter water from dispensing from the outlet aperture 32 of filter unit 10 upon elapsing or reaching the service life of the filter media portion 20. The flow regulator 102 may be disposed at various locations within the filter unit 10 and may be configured in various orientations to reduce, stop, or alter the water flow through the filter unit 10. Such reducing, stopping, or altering of the water flow through the filter unit 10 is configured for a user to recognize the same and replace the filter unit 10. Similarly, the flow regulator 102 may also cause a flow sensor in the appliance 38 to display a notification to the user via the interactive display 50, or other notification devices. As such, the interactive display 50 may also be disposed within freezer compartment 42 or the refrigeration compartment 44 (FIG. 1), or other suitable location as required for a particular application. The inactive display 50 may comprise a screen such as an LCD screen, or one or more light sources that can be selectively illuminated to provide information to a user. In addition, the interactive display 50 may also include one or more user input features such as push buttons or a touch screen that has one or more illuminated icons and/or other symbols and/or wording to communicate specific information to a user.

As illustrated in FIGS. 9-10, the flow regulator 102 of the filter unit 10 may include an expanding material 104 impregnated in pores 106 of the filter media portion 20. The expanding material 104 may include an absorbent polymer material that is configured to expand upon interacting with the unfiltered water flow passing through permeable media wall 22. The expansion rate of the expanding material 104 is configured to correlate with the depletion rate of the filter media portion 20, such that the expanding material 104 expands to a size that substantially reduces or stops the flow of water through the filter media portion 20 upon elapsing or reaching the service life of the filter media portion 20. As shown in FIG. 10, the expanding material 104 has absorbed enough water to swell and expanded to occupy the pores 106 and also compact the media material surrounding the pores 106 in the filter media portion 20, resulting in the unfiltered water flow through the filter media wall 22 to substantially cease. This flow reduction is configured for a user to recognize the same and replace the filter unit 10.

Figure 11:
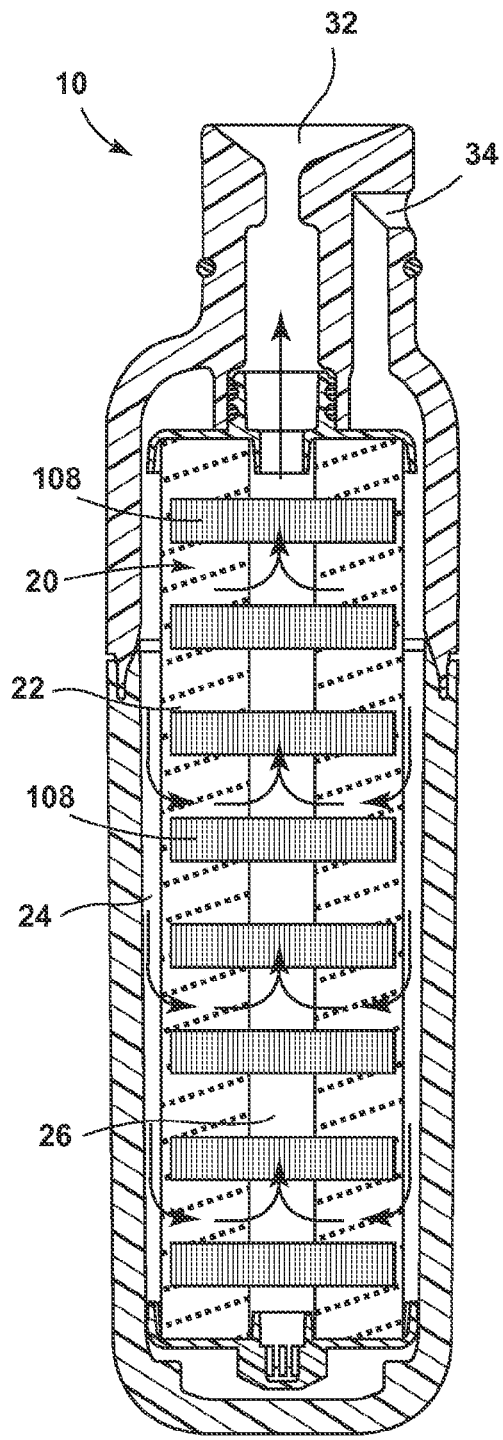
FIG. 11 is a side cross-sectional view of an additional embodiment of a water filter, illustrating impregnated media.
Figure 12:
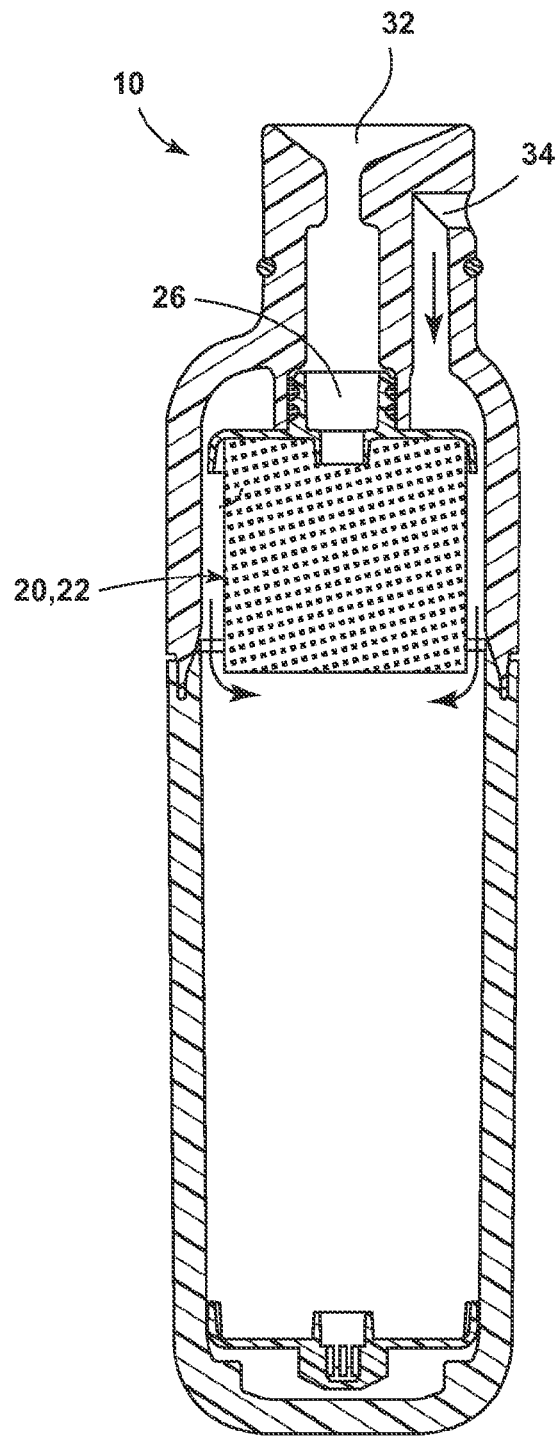
FIG. 12 is a side cross-sectional view of the additional embodiment of a water filter of FIG. 11, illustrating the impregnated media dissolved.

As illustrated in FIGS. 11-12, the flow regulator 102 of the filter unit 10 may include a dissolving material 108 impregnated in the filter media portion 20. The permeable media wall 22 of the filter media portion 20 conceivably includes a carbon block material. The dissolving material 108 may include a polymer material, such as the material used in dissolving resorbable medical stents. The dissolving material 108 is configured to dissolve upon interacting with the unfiltered water flow passing through the permeable media wall 22. The dissolving material 108 is configured to dissolve at a rate that correlates with the depletion rate of the filter media portion 20, such that the dissolving material 108 dissolves and the permeable media wall 22 collapses, as shown in FIG. 12, upon elapsing or reaching the service life of the filter media portion 20. The collapsed permeable media wall 22 is configured to compact the media material to clog the outlet aperture 32 and the interior passage 26, thereby restricting or stopping the flow of water through the filter unit 10.

Figure 13:
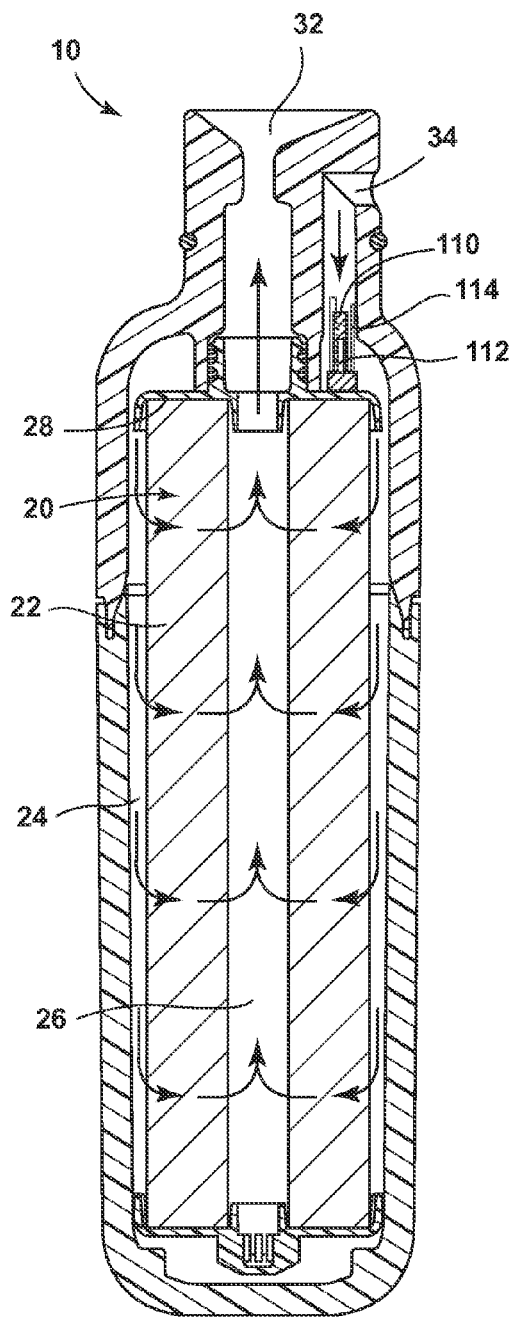
FIG. 13 is a side cross-sectional view of an additional embodiment of a water filter, illustrating a polymer plug.
Figure 14:
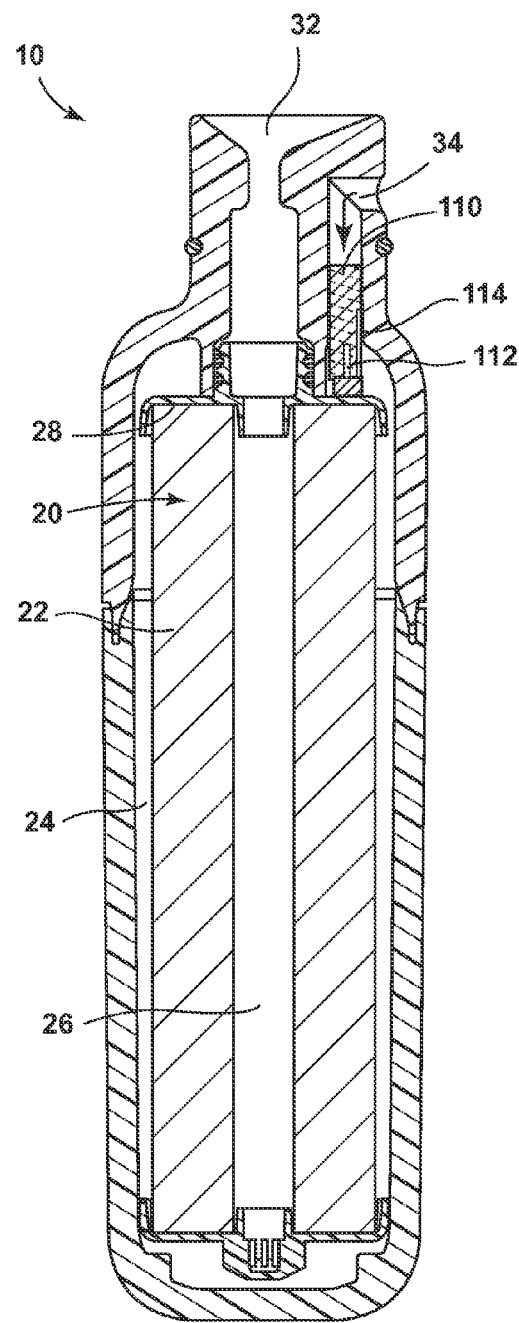
FIG. 14 is a side cross-sectional view of the additional embodiment of a water filter of FIG. 13, illustrating the polymer plug expanded.

As shown in FIGS. 13-14, the flow regulator 102 of the filter unit 10 may include an expanding polymer plug 110 disposed within the inlet aperture 34 in the engagement protrusion 84. More specifically, the expanding polymer plug 110 is positioned to longitudinally extend from the first end cap 28 centrally within a longitudinal portion of the inlet aperture 34. The expanding polymer plug 110 includes a support post 112 that connects the expanding polymer plug 110 with the first end cap 28 and guide arms 114 to hold and guide the plug 110 as it expands. The plug 110 is configured to expand in diameter and length upon interacting with the unfiltered water flow received through the inlet aperture 34 at an expansion rate that is configured to correlate with the depletion rate of the filter media portion 20. Accordingly, the plug 110 expands to a size that substantially occupies the inlet aperture 24, as shown in FIG. 14, reducing or stopping the flow of unfiltered water in through inlet aperture 34 upon elapsing or reaching the service life of the filter media portion 20.

Figure 15:
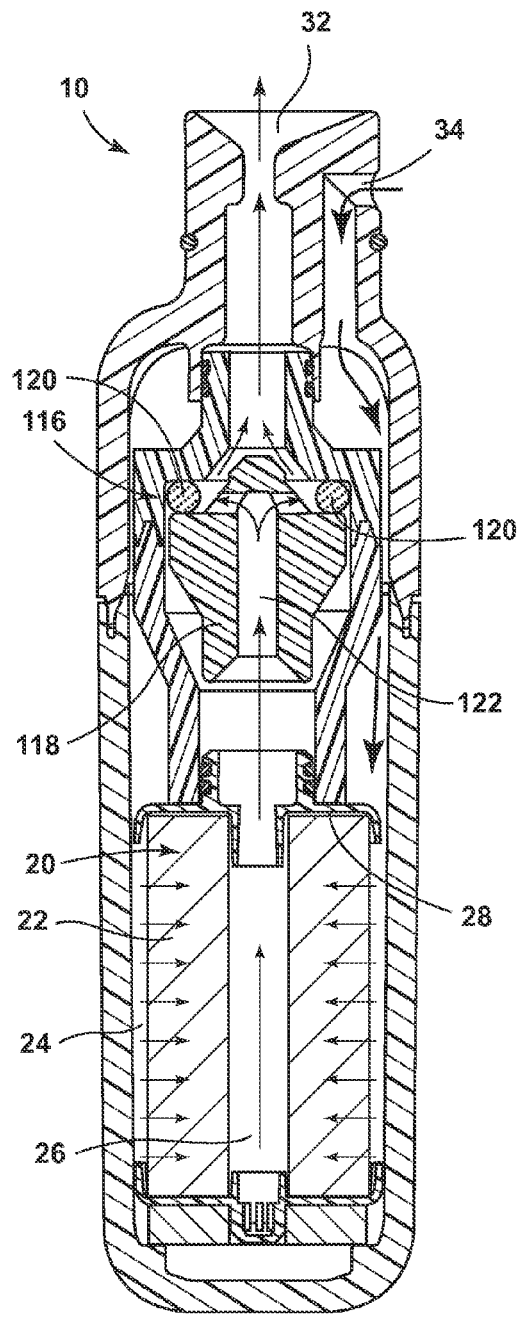
FIG. 15 is a side cross-sectional view of an additional embodiment of a water filter, illustrating a valve mechanism with an o-ring.
Figure 16:
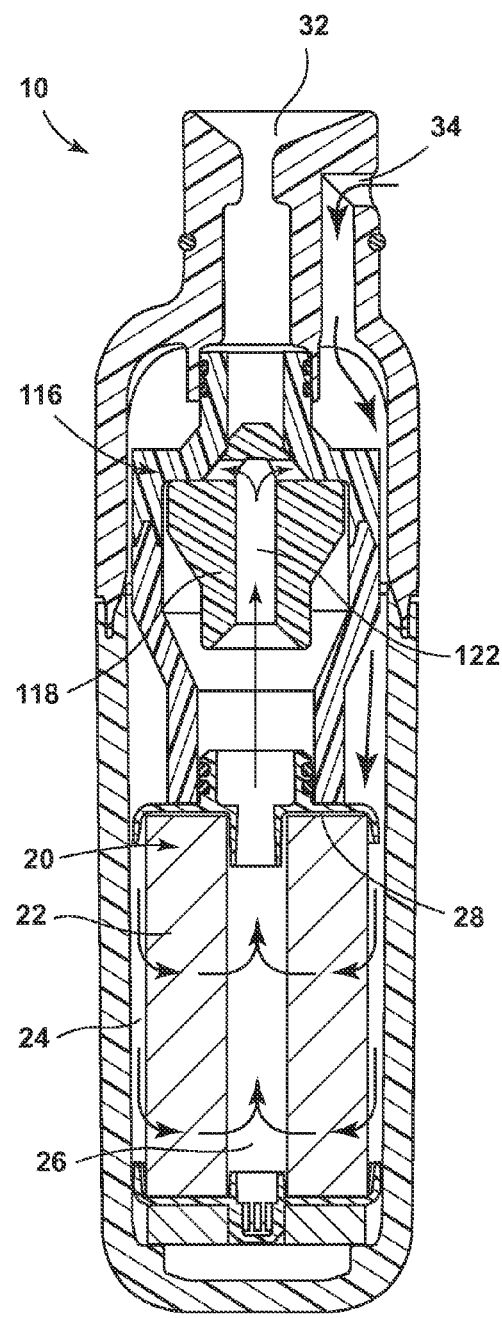
FIG. 16 is a side cross-sectional view of the additional embodiment of a water filter of FIG. 15, illustrating the o-ring dissolved.

As illustrated in FIGS. 15-16, the flow regulator 102 of the filter unit 10 may include a valve mechanism 116 coupled between the first end cap 28 and the outlet aperture 32. The valve mechanism 116 has a plunger 118 moveable between an open position and a closed position and an o-ring 120 supporting the plunger 118 in the open position. The plunger 118 includes a central passage 122 that is aligned with the interior passage 26, such that the filtered water flow travels though the central passage 122, past the o-ring 120, and out the outlet aperture 32. The o-ring 120 is configured to gradually dissolve upon interacting with the filter water flow from the interior passage 26, such that the plunger 118 is configured to gradually move closer to the outlet aperture 32 to the closed position upon dissolving of the o-ring. The o-ring 120 may include a polymer material, such as the material used in dissolving resorbable medical stents. The o-ring 120 is configured to dissolve at a rate that correlates with the depletion rate of the filter media portion 20, such that the o-ring 120 dissolves and the plunger 118 move the closed position, as shown in FIG. 16, upon elapsing or reaching the service life of the filter media portion 20.

Figure 17:
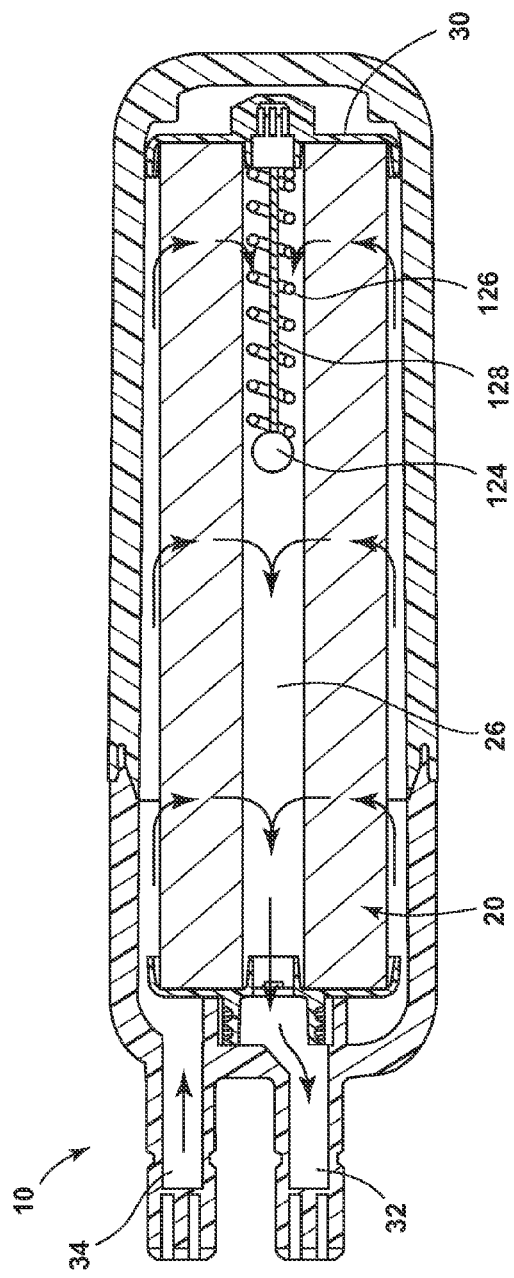
FIG. 17 is a side cross-sectional view of an additional embodiment of a water filter, illustrating a stopper in a compressed position.
Figure 18:
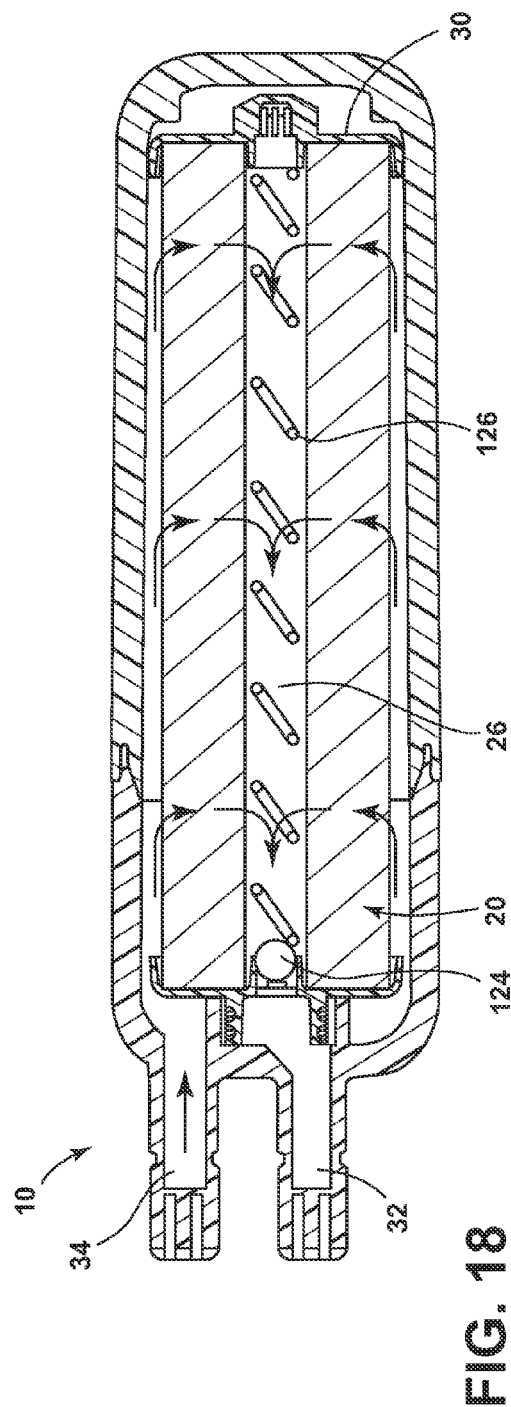
FIG. 18 is a side cross-sectional view of the additional embodiment of a water filter of FIG. 17, illustrating the stopper in a released position.

As shown in FIGS. 17-18, the flow regulator 102 of the filter unit 10 may include a spherical stop 124 suspended within the interior passage 26 and movable between an open position and a closed position. The stop 124 is spring biased with a coil spring 126 to the closed position, as shown in FIG. 18, that includes the stop 124 engaged with the periphery of the interior passage 26, such as a conical shaped seat, proximate the outlet aperture 32 to substantially reduce or stop the water flow through the filter unit 10. A fiber bundle 128 is coupled between the stop 124 and the second end cap 30 to hold the stop 124 in the open position. The fiber bundle 128 may include a polymer material, such as the material used in dissolving resorbable medical stents. The fiber bundle 128 is configured to gradually dissolve upon interacting with the filtered water flow from the interior passage 26, such that the fiber bundle 128 dissolves a rate that correlates with the depletion rate of the filter media portion 20. Accordingly, when the fiber bundle 128 dissolves the stop 124 moves to the closed position, upon elapsing or reaching the service life of the filter media portion 20. The periphery of the interior passage 26 that engages the stop 124 in the closed position, such as the conical shaped seat, may include small channels to allow some water to flow past the stop 124 in the closed position.

As illustrated in FIGS. 19-20, the flow regulator 102 of the filter unit 10 may include a sliding valve 130 disposed within the second end cap 30 in fluid connection between the exterior passage 24 and the interior passage 26. The sliding valve 130 has a conduit 132 extending between the exterior passage 24 and the interior passage 26, a cavity 134 adjacent the conduit 132, and a magnetic plate 136. The magnetic plate 136 is slidable between a first position in the conduit 132 and a second position in the cavity 134. In the first position, as shown in FIG. 19, the magnetic plate 136 substantially prevents unfiltered water flow from traversing from the exterior passage 24 to the interior passage 26. In second position, as shown in FIG. 20, the magnetic plate 136 allows the unfiltered water flow to bypass the filter media portion 20 and traverse through the conduit 132 to the interior passage 26. The magnetic plate 136 may include a metal material that is configured to conduct an electromagnet 138 positioned on a sidewall of the filter head assembly 62. The electromagnet 138 is positioned to align with the magnetic plate 136, such that the electromagnet 138 is may actuate upon receiving an electric current to slidably move the magnetic plate 136 between the first position and the second position. In addition, a hall sensor 140 may positioned within the filter head assembly 62 to similarly laterally align with the magnetic plate 136. The hall sensor 140 is configured to determine the relative position of the magnetic plate 136, such that the electromagnet 138 may be actuated to move the magnetic plate 136 to the second position upon elapsing or reaching the service life of the filter media portion 20 of the filter unit 10. It is also contemplated that the magnetic plate 136 may include a magnetized material, such as iron, nickel, cobalt, or rare earth metals, that is encased or coated with a protective polymer that does not harm water quality. Further, it is conceivable that the magnetic plate 136 may lock or become lodged when moved to the second position, such that the filter unit 10 may not be reset.

As shown in FIGS. 21-22, the flow regulator 102 of the filter unit 10 may also include a dual-port valve 142 disposed within the first end cap 28 in fluid connection between the interior passage 26 and the outlet aperture 32. The dual-port valve 142 has a large port 144 and a small port 146 both extending between the interior passage 26 and the outlet aperture 32. A shuttle slot 148 laterally extends between the large and small ports 144, 146 to retain a magnetic plate 150 that slidable between a first position and a second position. In the first position, the magnetic plate 150 substantially occupies the small port 146, as shown in FIG. 21, preventing filtered water flow from traversing through the small port 146 and directing filtered water flow through the large port 144. In the second position, the magnetic plate 150 substantially occupies the large port 144, as shown in FIG. 22, preventing filtered water flow from traversing through the large port 144 and directing filtered water flow through the small port 146 to reduce the flow rate of the filtered water flow. The magnetic plate 150 may include a metal material that is configured to conduct an electromagnet 152 positioned on a sidewall of the filter head assembly 62. The electromagnet 152 is positioned to align with the magnetic plate 150, such that the electromagnet 152 is may actuate upon receiving an electric current to slidably move the magnetic plate 150 within shuttle slot 148 between the first position and the second position. In addition, a hall sensor 154 may positioned within the filter head assembly 62 to similarly laterally align with the magnetic plate 136. The hall sensor 154 is configured to determine the relative position of the magnetic plate 136, such that the electromagnet 152 may be actuated to move the magnetic plate 150 to the second position upon elapsing or reaching the service life of the filter media portion 20 of the filter unit 10. It is also contemplated that the magnetic plate 150 may include a magnetized material, such as iron, nickel, cobalt, or rare earth metals, that is encased or coated with a protective polymer that does not harm water quality. Further, it is conceivable that the magnetic plate 150 may lock or become lodged when moved to the second position, such that the filter unit 10 may not be reset.

The filtration system 100 for the appliance 38, as illustrated in FIG. 23, includes a water source 60 coupled with the connector 58 on the appliance 38 to provide an intake water flow. An isolation valve 156 is coupled between the water source 60 and the filter unit 60 and movable between a first position and a second position. In the first position, the intake water flow is delivered to filter head assembly 62 to filter the intake water flow with the filter unit 20 to a filtered water flow, and thereafter to a chiller reservoir 158. The chiller reservoir 158 cools the filtered water flow to a chilled temperature that is less than the temperature of the intake water flow. A distribution valve 160 receives the cooled and filtered water flow when the isolation valve 156 is in the first position, and the distribution valve delivers the cooled and filtered water flow to the water dispenser 52 and to the ice maker 53 that supplies the ice dispenser 54. When the isolation valve 156 moves to the second position, the intake water flow is delivered via a bypass line 162 directly to the distribution valve 160, avoiding the filter unit 10 and the chiller reservoir 158. Accordingly, the isolation valve is configured to move to the second position upon expiration of the service life of the filter unit 10, such that a user may notice a temperature difference in water delivered from the water dispenser 152 and a taste and odor difference in the water and ice delivered from the water dispenser 152 and the ice dispenser 154. It is contemplated that the chiller reservoir 158 may be coupled at an alternative position in the filtration system 100, such as between the water dispenser 52 and the distribution valve 160.

An additional embodiment of the filtration system 100 for the appliance, as shown in FIG. 24, similarly includes a water source 60 coupled with the connector 58 of the appliance 38 to provide an intake water flow. The filter head assembly 62 and the filter unit 10 are coupled with the water source 60 to receive the intake water flow directly. The filter unit 10 has a predetermined service life to alter the intake water flow to a filtered water flow of desired standards. The chiller reservoir 158 receives and cools the filtered water flow to a chilled temperature that is less than the temperature of the intake water flow. The isolation valve 156 is coupled with the chiller reservoir 158 and is movable between a first position and a second position. In the first position, the isolation valve delivers the chilled and filtered water flow directly to the distribution valve 160, which is similarly coupled with the ice maker 53 and the water dispenser 52 of the appliance 38. In the second position, the isolation valve delivers the water flow to a flow restrictor 164 that is coupled between the isolation valve 156 and the distribution valve 156 on a bypass water line 162. Accordingly, the isolation valve 156 in the first position bypasses the flow restrictor to deliver the filtered water flow to the distribution valve 160. The isolation valve 156 is configured to move to the second position upon expiration of the service life of the filter unit, such that the flow rate of the water flow delivered to the water dispenser 52 and the ice maker 53 is reduced by the flow restrictor 164. This flow reduction is configured for a user to recognize the same and replace the filter unit 10.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A filter unit for an appliance, comprising:
   a body portion having an exterior surface and a hollow interior volume;
   a filter media portion disposed entirely within the interior volume and having a service life;
   an inlet aperture disposed on the exterior surface and extending into the interior volume, wherein the inlet aperture fluidly couples with a first side of the filter media portion to deliver a flow of unfiltered water;
   an outlet aperture disposed on the exterior surface and extending into the interior volume, wherein the outlet aperture fluidly couples a second side of the filter media portion to dispense a flow of filtered water; and
   a flow regulator disposed within the body portion and configured to reduce the flow of filtered water from dispensing from the outlet aperture upon elapsing the service life;
   wherein the flow regulator includes a dual-port valve disposed proximate the outlet aperture and having a large port, a small port, and a plate blocking the small port and providing flow through the large port and out through the outlet aperture before elapsing the service life of the filter media portion, and wherein the plate is slidable from the small port to block the large port upon elapsing the service life while providing less flow through the small port and out through the outlet aperture; and wherein the large and small ports are in the same plane and perpendicular to the body portion.

2. The filter unit of claim 1, further comprising:
   an electromagnet positioned adjacent to the exterior surface in alignment with the plate, wherein the plate includes a magnetic material that allows the electromagnet to slidably move the plate from small port to the large port.

3. The filter unit of claim 2, further comprising:
   a hall sensor positioned adjacent to the exterior surface in alignment with the plate, wherein the hall sensor is configured to determine the position of the plate relative to the small and large ports for determining whether the service life has elapsed.

4. The filter unit of claim 1, wherein the small and large ports separately extend between the outlet aperture and the filter media portion, and wherein the plate slides linearly within a channel extending between an intermediate portion of the small and large ports.

5. The filter unit of claim 4, wherein the large port includes a locking feature that engages the plate when the plate moves to the large port to prevent the plate from moving from the large port to the small port.

6. The filter unit of claim 5, wherein the locking feature includes a resilient element that frictionally engages a surface of the plate to retain the plate in a position blocking the large port.

7. The filter unit of claim 1, wherein the flow regulator includes a sliding valve fluidly coupled between an exterior passage and an interior passage, the sliding valve having a conduit fluidly connecting the inlet and outlet apertures and avoiding the filter media portion, a cavity disposed laterally adjacent to the conduit, and a magnetic plate blocking the unfiltered water from traversing the conduit and slidable into the cavity to allow the unfiltered water flow to bypass the filter media portion.

8. The filter unit of claim 7, further comprising:
an electromagnet positioned adjacent to the exterior surface in alignment with the plate of the sliding valve, wherein the plate includes a magnetic material that allows the electromagnet to slidably move the plate into the cavity when the service life has elapsed.

9. The filter unit of claim 8, further comprising:
a hall sensor positioned adjacent to the exterior surface in alignment with the plate, wherein the hall sensor is configured to sense the position of the plate of the dual-port valve relative to the small and large ports for determining whether the service life has elapsed.

10. A filter unit, comprising:
a body portion having an exterior surface and a hollow interior volume;
a filter media portion disposed entirely within the interior volume and having a service life;
an inlet aperture disposed on the exterior surface and extending into the interior volume, wherein the inlet aperture fluidly couples with a first side of the filter media portion to deliver a flow of unfiltered water;
an outlet aperture disposed on the exterior surface and extending into the interior volume, wherein the outlet aperture fluidly couples a second side of the filter media portion to dispense a flow of filtered water; and
a flow regulator disposed within the interior volume; wherein the flow regulator has a large port, a small port, and a plate blocking the small port and providing flow through the large port and out through the outlet aperture before elapsing the service life of the filter media portion, and wherein the plate is slidable from the small port to block the large port upon elapsing the service life while providing less flow through the small port and out through the outlet aperture; and wherein the large and small ports are in the same plane and perpendicular to the body portion.

11. The filter unit of claim 10, wherein the filter media portion includes a tubular sidewall and an end cap coupled with an first end portion of the tubular sidewall proximate a distal end of the body portion within the interior volume of the body portion, wherein the end cap urges the flow of unfiltered water to traverse laterally through the tubular sidewall.

12. The filter unit of claim 11, wherein the flow regulator is coupled with a second end portion of the tubular sidewall proximate the inlet and outlet apertures on the body portion.

13. The filter unit of claim 10, further comprising:
an electromagnet positioned adjacent to the exterior surface in alignment with the plate, wherein the plate includes a magnetic material that allows the electromagnet to slidably move the plate linearly within a channel from small port to the large port.

14. The filter unit of claim 13, further comprising:
a hall sensor positioned adjacent to the exterior surface in alignment with the plate, wherein the hall sensor is configured to sense the position of the plate relative to the small and large ports for determining whether the service life has elapsed.

15. The filter unit of claim 10, wherein the large port includes a locking feature that engages the plate when the plate moves to the large port to prevent the plate from moving from the large port to the small port.

16. The filter unit of claim 15, wherein the locking feature includes a resilient element that frictionally engages a surface of the plate to retain the plate in a position blocking the large port.

17. A filter unit, comprising:
a cylindrical body portion having a proximal end, a distal end, an interior volume there between, and a central axis extending centrally through the longitudinal extent of the interior volume;
a filter media portion disposed within the interior volume and having a service life, the filter media portion having a permeable media wall spaced away from the body portion to define an exterior passage and surrounding the central axis to define an interior passage;
an inlet aperture disposed on the proximal end and extending into the interior volume, wherein the inlet aperture fluidly couples with the exterior passage to deliver unfiltered water to the permeable media wall;
an outlet aperture disposed on the proximal end and extending into the interior volume, wherein the outlet aperture fluidly couples with the interior passage to dispense filtered water from the permeable media wall; and
a flow regulator disposed in fluid connection between the interior passage and the outlet aperture; wherein the flow regulator has a large port, a small port, and a magnetic plate blocking the small port and providing flow through the large port and out through the outlet aperture before elapsing the service life of the filter media portion, and wherein the magnetic plate is linearly slidable from the small port to block the large port upon elapsing the service life while substantially preventing flow through the small port and out through the outlet aperture; and wherein the large and small ports are in the same plane and perpendicular to the body portion.

18. The filter unit of claim 17, further comprising:
a filter head assembly of an appliance configured to engage the inlet and outlet apertures, wherein the filter head assembly has an electromagnet positioned to align with the magnetic plate and to slidably move the magnetic plate from the small port to the large port.

19. A filter unit of claim 18, further comprising:
a hall sensor positioned on the filter head assembly to align with the magnetic plate, wherein the hall sensor is configured to sense the position of the magnetic plate for determining whether the service life has elapsed.

\* \* \* \* \*